(12) United States Patent  (10) Patent No.: US 8,894,810 B2
Lim  (45) Date of Patent: Nov. 25, 2014

(54) FLOATING SALT FARM

(71) Applicant: Jae Hyun Lim, Cresskill, NJ (US)

(72) Inventor: Jae Hyun Lim, Cresskill, NJ (US)

(73) Assignee: Pioli Systems Inc., Palisades Park, NJ (US)

( * ) Notice: Subject to any disclaimer, the term of this patent is extended or adjusted under 35 U.S.C. 154(b) by 0 days.

(21) Appl. No.: 13/662,534

(22) Filed: Oct. 28, 2012

(65) Prior Publication Data

US 2013/0048226 A1 Feb. 28, 2013

(51) Int. Cl.
B01D 1/00 (2006.01)
C02F 1/04 (2006.01)
C01D 3/06 (2006.01)

(52) U.S. Cl.
CPC ................ C01D 3/06 (2013.01); B01D 1/0005 (2013.01); C02F 1/04 (2013.01); Y10S 159/41 (2013.01)
USPC ............. 159/34; 23/295 R; 23/298; 159/28.6; 159/45; 159/DIG. 41; 202/83; 203/10; 203/48; 210/170.05; 210/170.11; 210/242.1; 405/203

(58) Field of Classification Search
USPC ........... 23/295 R, 298, 306; 159/28.6, 34, 45, 159/902, DIG. 1, DIG. 41; 202/83; 203/10, 203/47, 48, DIG. 17; 210/170.05, 170.11, 210/242.1; 405/203
See application file for complete search history.

(56) References Cited

U.S. PATENT DOCUMENTS

| | | | |
|---|---|---|---|
| 3,440,146 A * | 4/1969 | Louw | 203/11 |
| 3,785,314 A | 1/1974 | Scanlan | |
| 4,335,576 A * | 6/1982 | Hopfe | 60/398 |
| 4,356,785 A * | 11/1982 | Bailie | 114/264 |
| 4,391,675 A | 7/1983 | Lynn et al. | |
| 7,416,666 B2 | 8/2008 | Gordon | |
| 7,448,600 B1 * | 11/2008 | Boulter | 261/28 |
| 2003/0080066 A1* | 5/2003 | Vohra et al. | 210/714 |
| 2006/0283802 A1* | 12/2006 | Gordon | 210/652 |
| 2011/0008243 A1* | 1/2011 | Sadan | 423/499.1 |
| 2011/0120854 A1* | 5/2011 | Lee | 203/86 |
| 2011/0139623 A1 | 6/2011 | Al-Sadah | |

FOREIGN PATENT DOCUMENTS

GB EP 0011922 B1 1/1983
KR EP 2436652 A2 4/2012

* cited by examiner

Primary Examiner — Virginia Manoharan

(57) ABSTRACT

A floating salt farm in which its purpose is to produce crystallized salt and bittern at offshore locations through the evaporation process using extracted seawater. The floating salt farm components can be consisted of a seawater tank, an evaporator tank, a heating tank, a deposit tank, a storage tank, and photovoltaic panels, which these components are installed onto the buoyant foundation. The evaporator tank component can consist of an evaporator plate and an evaporator bin. The evaporator plate, which captures the produced crystallized salt during the evaporation process, has a sieve surface. The contents inside the evaporator bin can affect the properties of the produced crystallized salt and bittern, such as their mineral compositions, during the evaporation process. The seawater can be extracted from desired water depths and/or in the proximity of volcanic sites, in which the seawater can have affected mineral compositions due to volcanic activity.

5 Claims, 27 Drawing Sheets

FLOATING SALT FARM

BACKGROUND OF THE INVENTION

Using traditional salt ponds, plentiful sunlight and sea breeze are needed to produce natural sun-dried salt. To produce natural sun-dried salt at traditional salt ponds, the seawater is clean and at standard salinity. The produced natural sun-dried salt is high in mineral content due to the mud used in traditional salt ponds. However, using traditional salt ponds to produce natural sun-dried salt can have several limitations. One limitation is, the salt crystallization process to produce natural sun-dried salt cannot occur after sunset and before sunrise or during inclement weather conditions, such as cloudy and rainy weather, at the traditional salt pond locations due to lack of sunlight. Another limitation is, a large surface area is needed for the shallow basins in the traditional salt ponds in order to intake plentiful sunlight throughout the surface area. Also, traditional salt ponds must be at locations where clean seawater at standard salinity is readily available. By using the present invention, however, most of the limitations for salt production in traditional salt ponds are overcome.

The present invention, the floating salt farm, can produce crystallized salt and bittern at offshore locations from extracted seawater at standard salinity using the evaporation process. Some considerations must be taken into account for choosing a location with uncontaminated seawater at standard salinity to be used for the floating salt farm. It is not viable to extract seawater in the vicinity of industrial areas or large cities where the seawater may be polluted. The seawater extracted may also not be in the vicinity of freshwater sources, such as rivers or icebergs, as it could lower seawater salinity. Also, locations with records of frequent rainfall or snow may lower seawater salinity. If these locational conditions are fulfilled, the floating salt farm would work in any weather condition and at any location.

Additionally, the floating salt farm can also run continuously at any time provided that energy sources are continuously supplied, such as with a transport vessel.

The buoyant foundation of the floating salt farm must have sufficient buoyancy and be able to support the weight of the floating salt farm components. A linked combination of different types of buoyant support structures, to support the buoyant foundation, can be used. The stability of the floating salt farm must be sufficient to withstand inclement weather conditions and hitting sea waves.

The floating salt farm components are installed on the flooring deck, in which the flooring deck is on top of the buoyant foundation.

The floating salt farm can be reinforced with offshore structures. At locations where the floating salt farm cannot be reinforced with offshore structures, the floating salt farm can have an installed motor propeller component or can be moved by towboat when transporting the floating salt farm to a certain offshore location or moving the floating salt farm to a safe location at times of inclement weather conditions.

A floating salt farm can produce various types of crystallized salt and bittern. The evaporator tank, a floating salt farm component, can be used to evaporate seawater at standard salinity to produce crystallized salt and bittern. By adjusting the heating temperature during the evaporation process, the produced crystallized salt and bittern would have different properties, such as their taste.

Also, if certain contents are placed with the seawater inside the evaporator tank during the evaporation process, the produced crystallized salt and bittern can be adjusted to have desired properties, such as color, taste, smell, and mineral composition.

To produce crystallized salt and bittern of desired quality, such as the quality of natural sun-dried salt and bittern produced in traditional salt ponds, several adjustments can be made during the evaporation process in the floating salt farm. To do so, mud, which can be the mud used in traditional salt ponds, can be placed inside the evaporator tank with the extracted seawater during the evaporation process and the heating temperature can be adjusted accordingly. Installed wind propeller components in the evaporator tank can be used to emulate the sea breeze.

Crystallized salt and bittern can be produced using seawater extracted at desired water depths, in which the extracted seawater can have desired mineral compositions. A seawater extraction vessel can be used to extract the seawater and then be delivered to the floating salt farm.

The seawater used for the evaporation process can be extracted in the proximity of volcanic sites, in which the seawater in those areas can have affected mineral compositions, due to volcanic activity. The volcano, in which has affected the mineral composition of seawater to be extracted for the evaporation process, can be an underwater volcano or a volcano on land.

The floating salt farm can be powered by renewable energy sources. The evaporation process in the floating salt farm can be powered by photovoltaic panel components, which can be installed on the floating salt farm, or offshore wind turbines.

BRIEF SUMMARY OF THE INVENTION

The purpose of the floating salt farm is to produce crystallized salt and bittern from extracted seawater using the evaporation process at offshore locations. The buoyant foundation of the floating salt farm can be composed of a linked combination of different types of buoyant support structures, in which must have sufficient buoyancy and stability to support salt farm components.

A barge can also be used as a buoyant foundation for the floating salt farm, which then the floating salt farm components are fixed on the top of the flooring deck of the barge.

The flooring deck, which is fixed on top of the buoyant foundation, supports the floating salt farm components, which is used to produce crystallized salt and bittern.

The components of the floating salt farm can be consisted of the seawater tank, the evaporator tank, and the heating tank. The seawater tank can extract seawater at standard salinity and is inserted into a filter system which removes solid substances such as sand. The filtered seawater is then pumped into the evaporator tank, in which the evaporation process is then performed. The heating used for the evaporation process can be supplied through a heat exchanger or heat exchangers attached to the outer or inner surface of the evaporator tank. The liquid used in the heat exchangers is heated in the heating tank. The heating energy used for heating the heat exchangers can be supplied by electricity and gas. The electricity can be supplied using various methods. Electricity can be supplied using photovoltaic panel components, which can be installed on the floating salt farm. The electricity supplied can also be generated from a gas generator or can be supplied from rechargeable electric batteries delivered using a transport vessel. Electricity can also be supplied from electricity poles on land through electric cables or from offshore wind turbines. Another energy source to heat the heating tank is from a gas burner. These energy sources can be used in combination to supply the operating floating salt farm with energy continuously. The transport vessel can continuously supply energy sources to the floating salt farm in order for the floating salt farm to run continuously and at any time. After the evaporation process has finished in the evaporator tank, the produced crystallized salt is settled on the evaporator plate, which is an installed evaporator tank component located inside the evaporator tank. The evaporator plate surface has small holes, which form a sieve surface, which allows the produced bittern mixed with the produced crystallized salt to seep to the bottom of the evaporator tank. The produced crystallized salt can then be pumped into the deposit tank by using the crystallized salt extraction tube. After the crystallized salt extraction process from the evaporator tank, the evaporator plate is then lifted with a controller. The remaining bittern produced during the evaporation process, which is located below the evaporator plate, is then extracted from the evaporator tank by using the bittern extraction tube and is then pumped into the bittern storage tank. After the evaporation process is repeated several cycles, the evaporator tank can be cleaned using a pressured hose spraying filtered seawater, in which afterwards, the seawater used for cleaning is extracted from the evaporator tank using an extraction tube. The evaporation process is then resumed. If there is no deposit or storage tank component installed on the floating salt farm, the produced crystallized salt and bittern can then be sent to the warehouse on the harbor by transport vessel.

The components of the floating salt farm can also be consisted of the deposit tank, the storage tank, and the photovoltaic panels. After the evaporation process, the produced crystallized salt can then be placed into the deposit tank. The flooring of the deposit tank can be at an angled slope to help detach the bittern that is attached to the crystallized salt. At the bottom of the slope, there can be a mesh opening to allow the bittern, which can be detached from the crystallized salt, to seep through. Afterwards, the produced crystallized salt and bittern can then be placed into the storage tank and bittern storage tank respectively. Inside the storage tank, the flooring can also be at an angled slope to help detach the bittern that is attached to the crystallized salt. The storage tank can also have a mesh opening to allow the bittern to seep through at the bottom of the slope, which leads to the bittern storage tank. The storage tank can have openings to allow the sea breeze inside the storage tank, such as windows, and can have installed wind propeller components to help dry the crystallized salt. Also, a heater can be installed inside the storage tank to help dry the crystallized salt by adjusting the temperature inside the storage tank. Afterwards, the dried crystallized salt and the gathered bittern are kept inside the storage tank until they are ready to be transported to a warehouse on the harbor using a transport vessel. The produced crystallized salt and the bittern can be further processed at facilities on the harbor. The photovoltaic panels can be installed on the floating salt farm to generate electricity to supply energy to the heating tank to conduct the evaporation process, if the location where the floating salt farm is sited, provides plentiful sunlight.

A floating salt farm can be composed of components such as a seawater tank, evaporator tank, heating tank, deposit tank, storage tank, and photovoltaic panels. However, at locations where higher stability may be needed such as at locations with recurring inclement weather conditions, the deposit tank, storage tank, and photovoltaic panels can be separated and placed at a safe location, such as the harbor.

All the floating salt farm components can have devices such as motors, pumps, temperature gauges, and controllers installed. Also, the floating salt farm components must be fixed to the flooring deck and can be reinforced by tank supports to keep the floating salt farm components fixed in place. All the materials of the floating salt farm components can be anti-corrosive.

If certain contents are placed with the filtered seawater inside the evaporator tank during the evaporation process, the produced crystallized salt and bittern can be adjusted to have desired properties such as color, taste, smell, and mineral composition, depending on the contents placed inside the evaporator tank. These contents are put inside the evaporator bin, a holding device, such as a container, which can be linked to the bottom of the evaporator plate. The contents inside the evaporator bin can be boiled before the evaporation process with the filtered seawater inside the evaporator tank to prepare and concentrate these contents for the evaporation process. Afterwards, filtered seawater from the seawater tank is pumped into the evaporator tank, and the evaporation process is conducted. After repeating the evaporation process several cycles, the evaporator tank can be cleaned using a pressured hose spraying filtered seawater, in which afterwards, the remaining seawater used for cleaning is extracted from the evaporator tank. This extracted seawater can be treated before discarding.

The seawater to be used for the floating salt farm can be extracted at desired water depths to extract seawater with desired mineral compositions using a seawater extraction vessel. The extracted seawater is then transported to the floating salt farm to be used to produce crystallized salt and bittern.

The seawater can also be extracted in the proximity of volcanic sites, in which the seawater in those areas can have affected mineral compositions, due to volcanic activity. The volcano, in which has affected the mineral composition of seawater to be extracted for the evaporation process, can be an underwater volcano or a volcano on land.

To produce crystallized salt and bittern of desired quality, such as the quality of natural sun-dried salt and bittern produced in traditional salt ponds, several adjustments can be made during the evaporation process in the floating salt farm. To do so, mud, which can be the mud used in traditional salt ponds, can be placed inside the evaporator bin inside the evaporator tank with the extracted seawater during the evaporation process and the heating temperature can be adjusted accordingly. Installed wind propeller components in the evaporator tank can be used to emulate the sea breeze.

DETAILED DESCRIPTION OF THE INVENTION

Detailed embodiments of the invention can be illustrated using the accompanying drawings as reference.

Figure 1A:
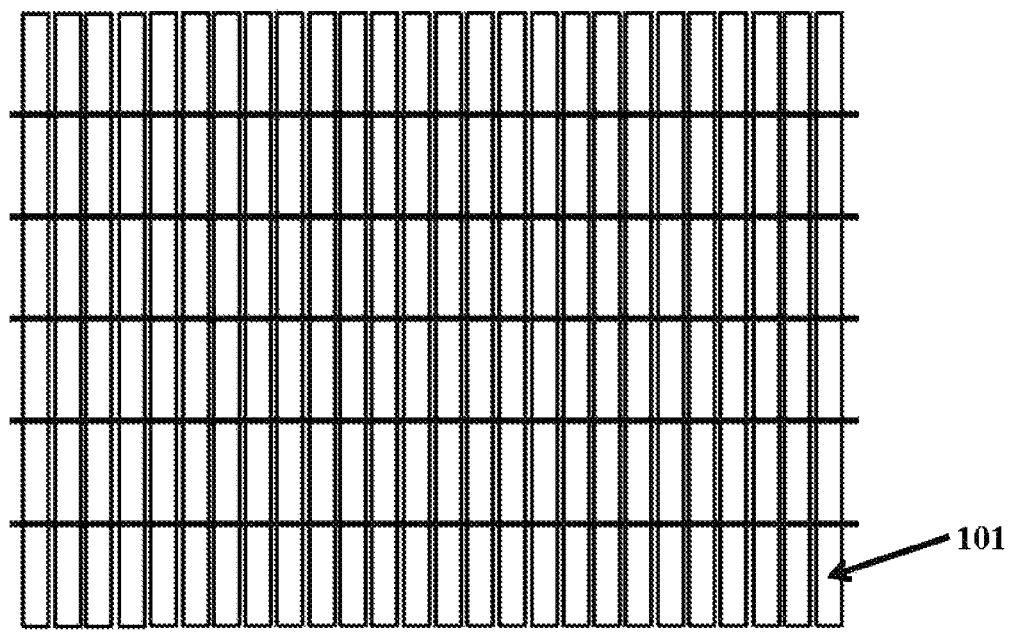
FIGS. 1A and 1B are top views of different configurations of the buoyant foundation of the floating salt farm.
Figure 1B:
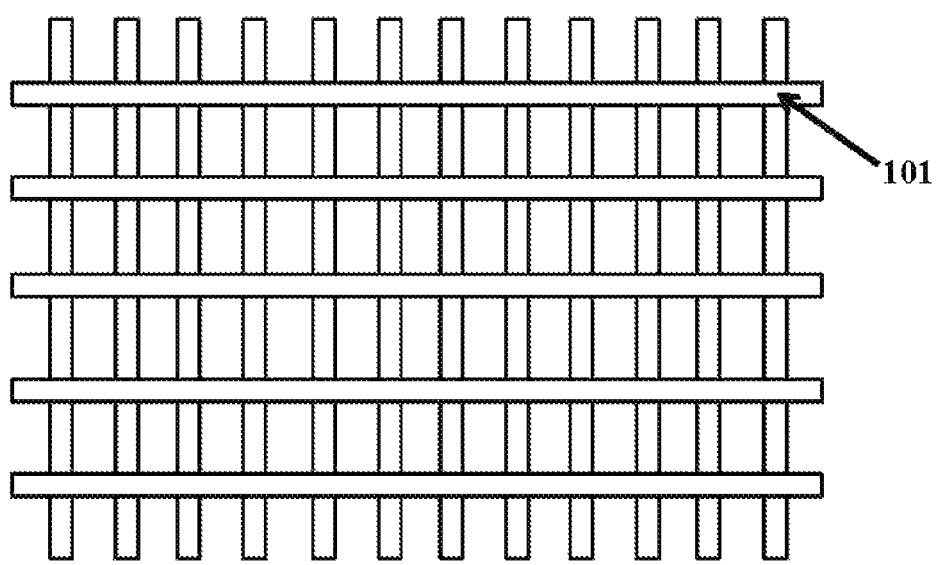

The buoyant foundation 101 of the floating salt farm must have sufficient buoyancy and must be able to support the weight of the floating salt farm components 400, which lie on the buoyant foundation 101. The buoyant foundation 101 can be composed of linked buoyant support structures 102 and can be arranged into different configurations, as shown in FIGS. 1A and 1B.

Figure 2A:
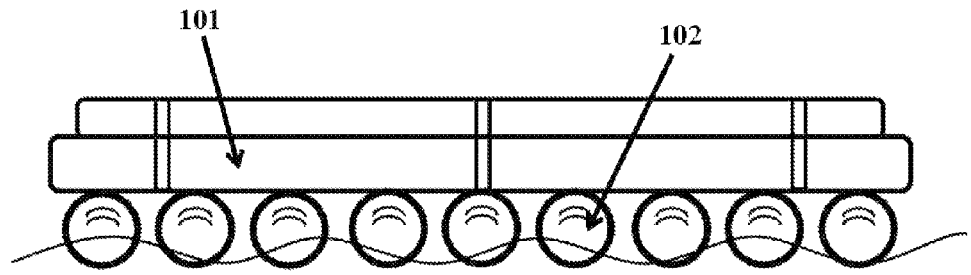
FIGS. 2A, 2B, and 2C are side views of different combinations of linked buoyant support structures that can be used to support the buoyant foundation.
Figure 2B:
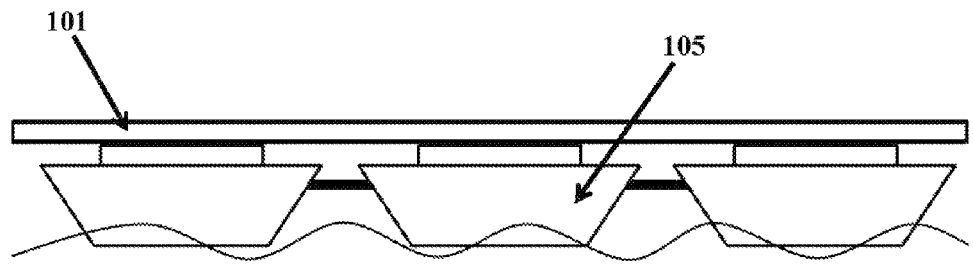
Figure 2C:
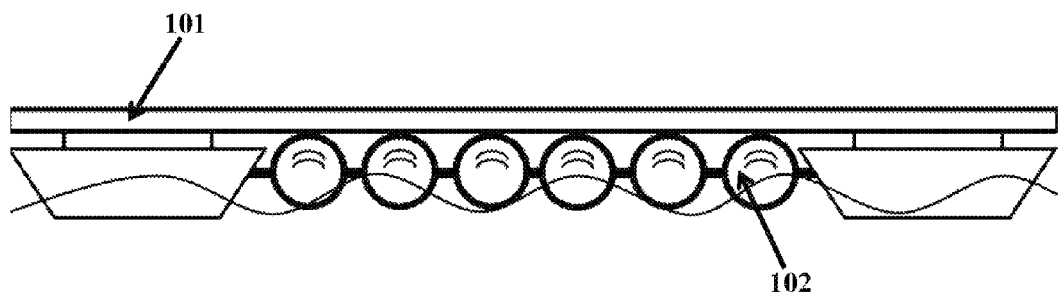

Buoyant support structures used to support the buoyant foundation 101 of the floating salt farm can be composed of linked buoyant support structures 102 as shown in FIG. 2A. The buoyant foundation 101 can also be installed on top of linked small flat-bottomed boats 105 as shown in FIG. 2B. A linked combination of different types of buoyant support structures 102 can be used, as shown in FIG. 2C.

Figure 3A:
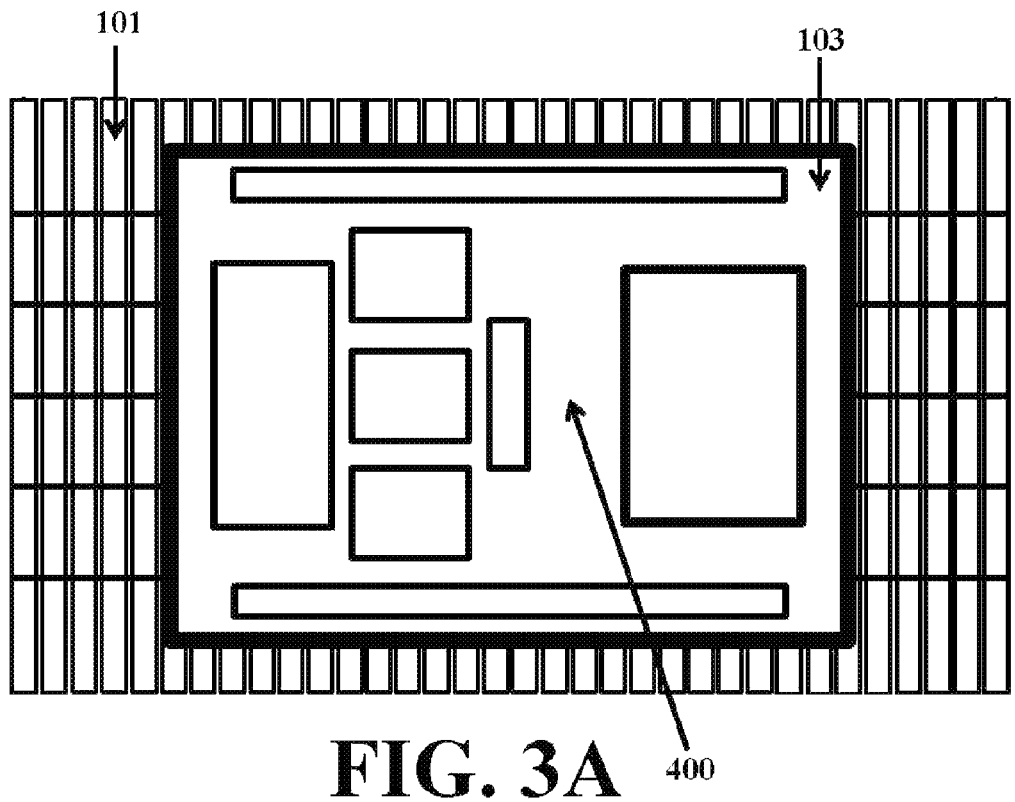
FIGS. 3A and 3B are a top view and a side view of the buoyant foundation.
Figure 3B:
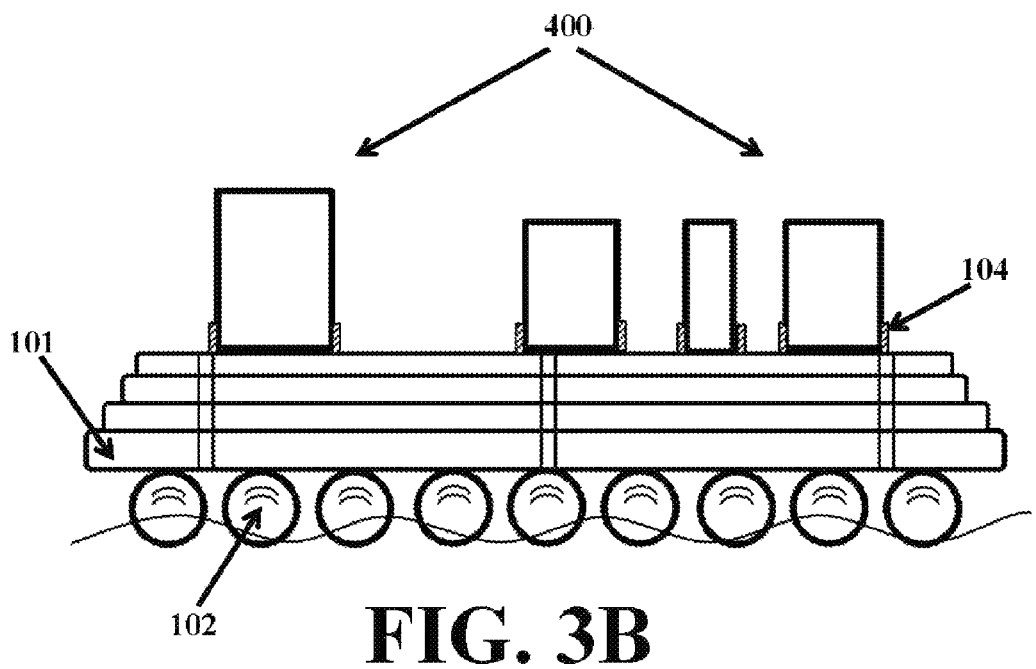

The floating salt farm components 400 are fixed on the flooring deck 103, which the flooring deck 103 is installed on top of the buoyant foundation 101, as shown in FIGS. 3A and 3B. The floating salt farm must have sufficient buoyancy and stability to withstand inclement weather conditions and hitting sea waves. To increase stability, the buoyant foundation 101 can be wider and higher, as shown in FIGS. 3A and 3B.

Figure 4A:
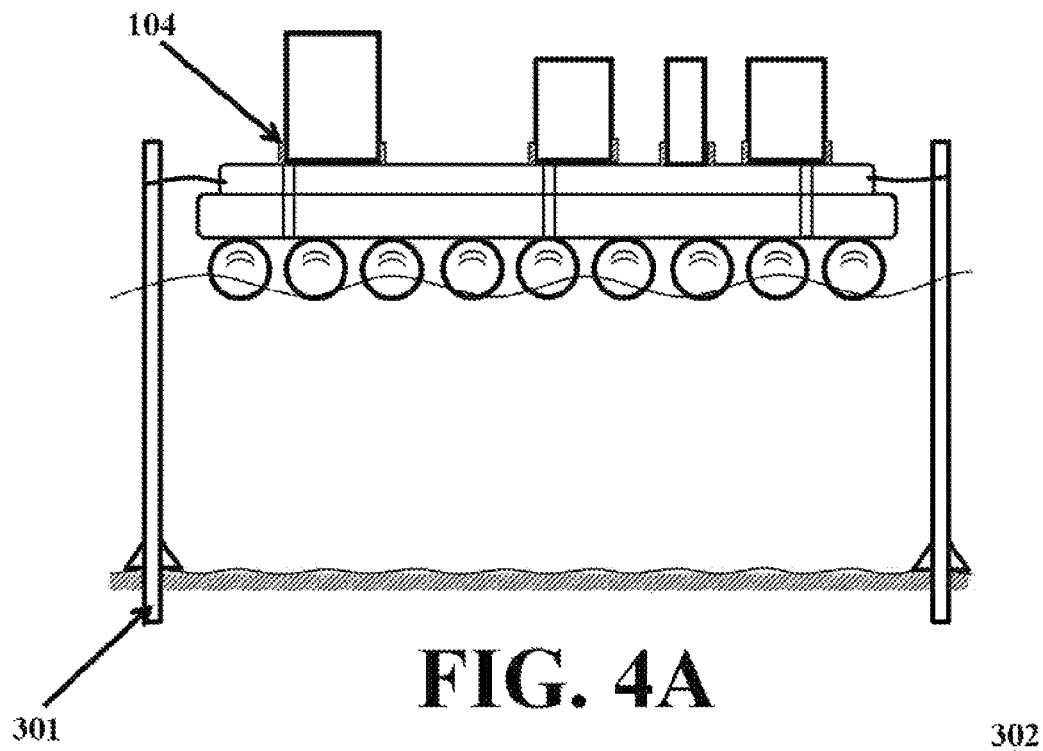
FIGS. 4A, 4B, and 4C illustrate different embodiments to reinforce the floating salt farm with offshore structures or support structures.
Figure 4B:
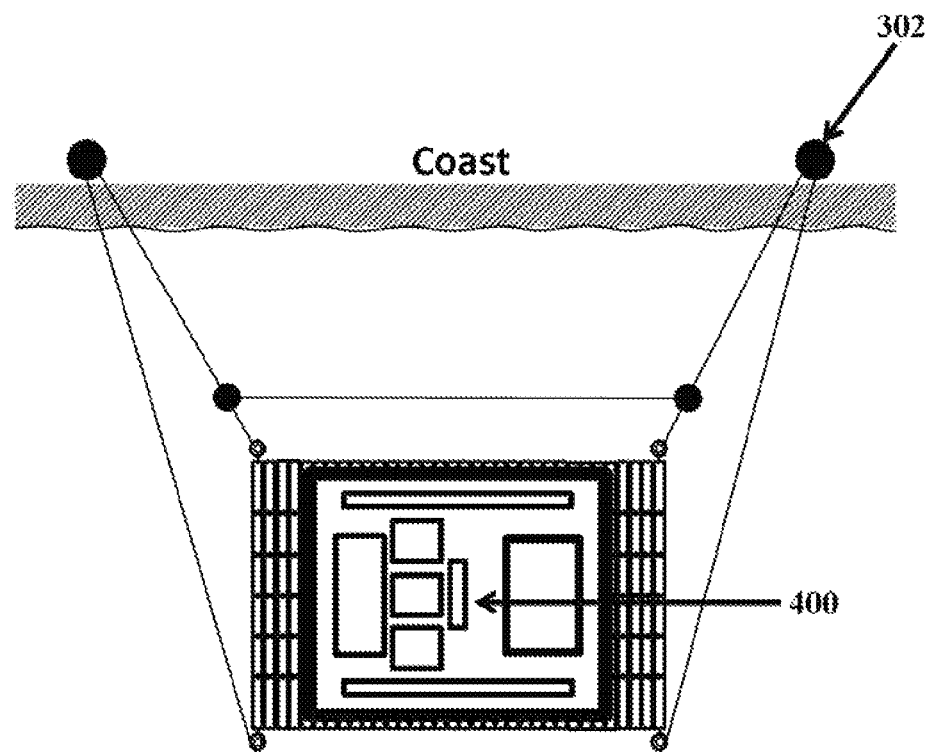
Figure 4C:
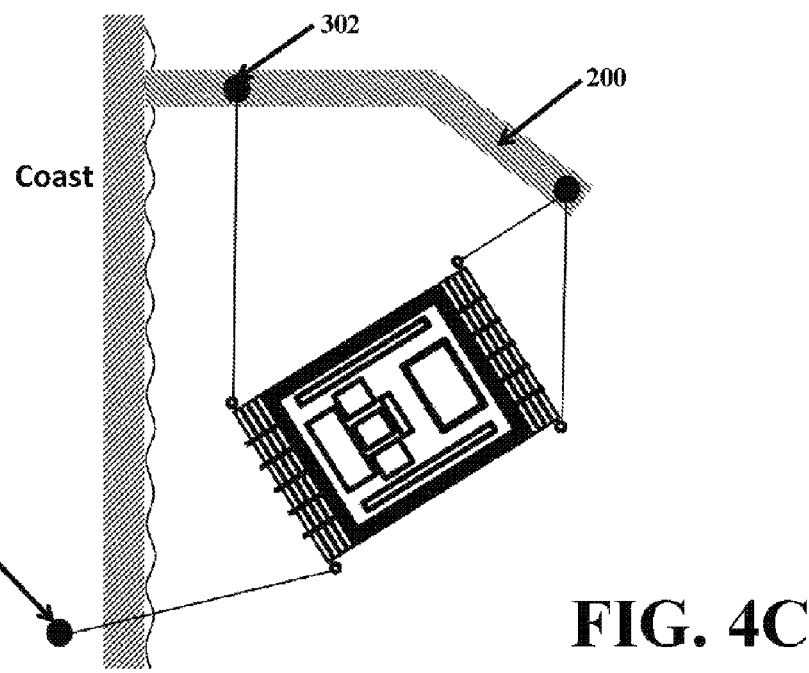
Figure 4D:
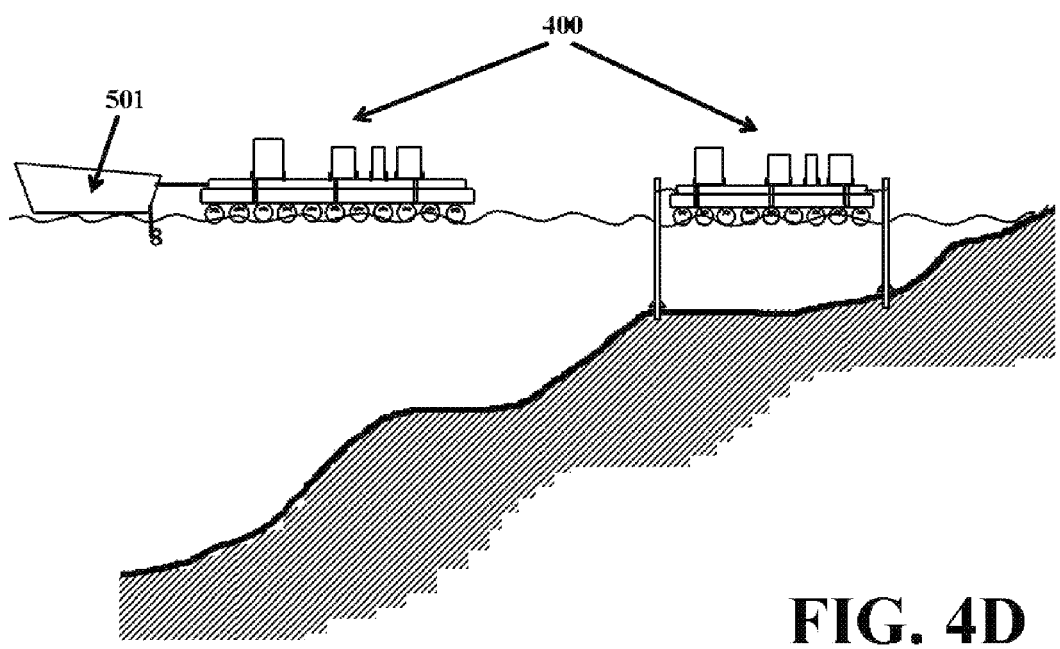
FIG. 4D is a side view of the floating salt farm in movement by towboat.

The floating salt farm can be reinforced with offshore structures 301, as shown in FIG. 4A. A floating salt farm can also be reinforced with support structures 302 installed on land, as shown in FIG. 4B, or on the sea wall 200, as shown in FIG. 4C. At locations where the floating salt farm cannot be reinforced with offshore structures 301 or support structures 302 on land, the floating salt farm can be moved by towboat 501 when transporting the floating salt farm to a certain offshore location, as shown in FIG. 4D.

Figure 5:
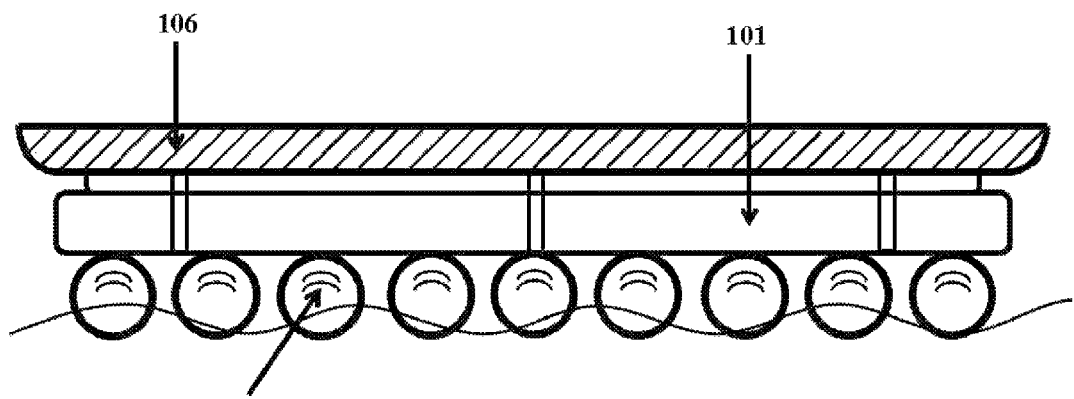
FIG. 5 is a side view of a foundation wall installed onto the perimeter of the buoyant foundation of the floating salt farm.

In order to prevent sea waves from hitting the floating salt farm components 400, a foundation wall 106 can be installed to the floating salt farm on the buoyant foundation 101, as shown in FIG. 5.

Figure 6A:
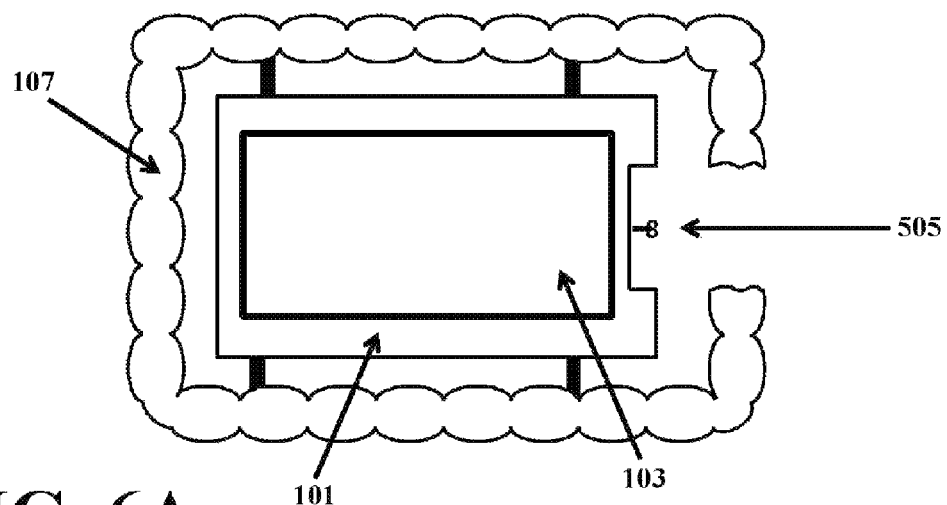
FIG. 6A is a top view of an embodiment of a floating salt farm with an installed buoyant sea wall and FIGS. 6B and 6C are a front view and a side view of a buoyant sea wall used to protect the floating salt farm.
Figure 6B:
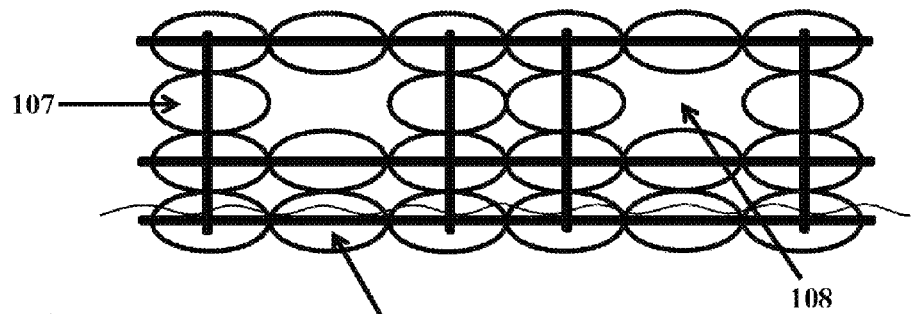
Figure 6C:
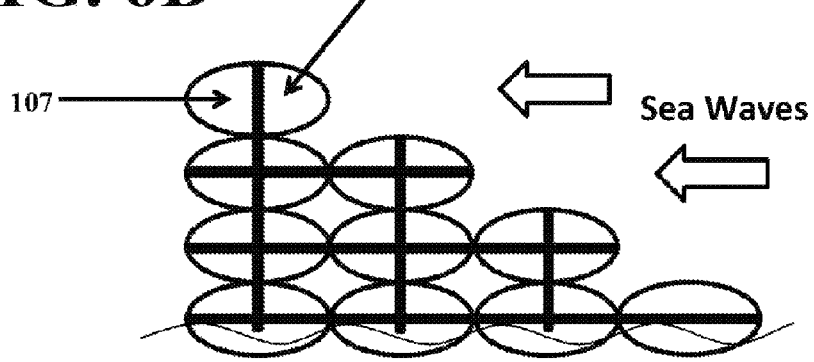
Figure 8:
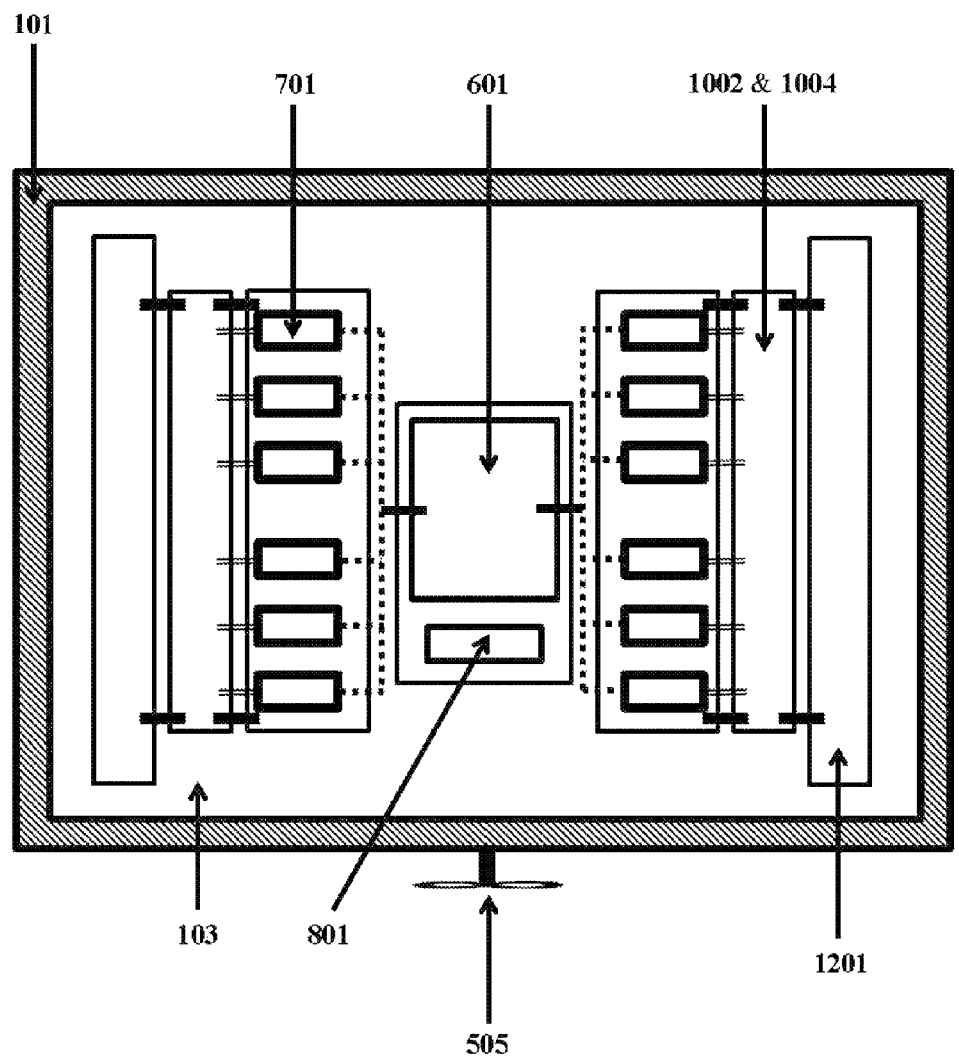
FIG. 8 is a top view of an arrangement of the floating salt farm components of an embodiment of the floating salt farm.

A buoyant sea wall 107 can be installed to increase safety to the floating salt farm. A buoyant sea wall 107 is placed around the perimeter of and slightly away from the buoyant foundation 101 of the floating salt farm, as shown in FIG. 6A. The buoyant sea wall 107 can be composed of several layers of linked buoyant structures 111 and can have wind openings 108 to prevent winds from damaging the buoyant sea wall 107, as shown in FIGS. 6B and 6C. The floating salt farm with an installed buoyant sea wall 107 can also have a motor propeller component 505 installed, as shown in FIG. 6A. During inclement weather conditions, the floating salt farm can be moved by its installed motor propeller component 505, as shown in FIG. 8, to a safe location, such as the harbor.

Figure 7:
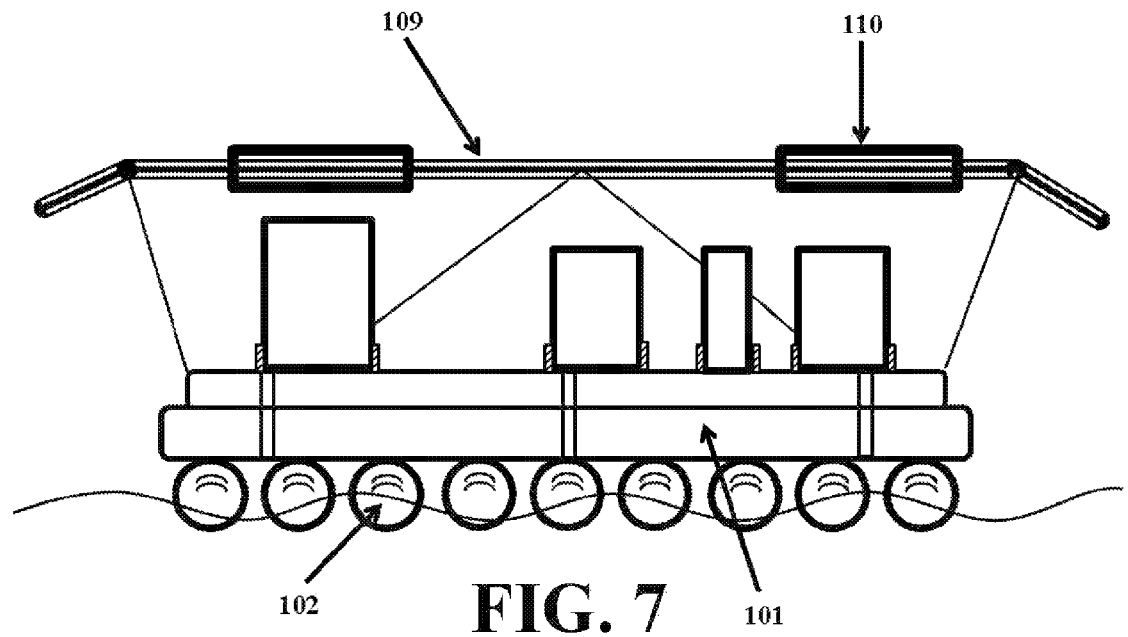
FIG. 7 is a side view of a customized ceiling of the floating salt farm components.

The components of the floating salt farm can be protected from weather conditions such as rain and snow by a customized ceiling 109 as shown in FIG. 7. The customized ceiling 109 can have several windows 110 to intake sunlight for the photovoltaic panels 1201, which are components of the floating salt farm, as shown in FIG. 8.

The components of the floating salt farm can be consisted of the seawater tank 601, the evaporator tank 701, and the heating tank 801, the deposit tank 1002, storage tank 1004, and the photovoltaic panels 1201. An embodiment of the floating salt farm is shown in FIG. 8. However, at locations where higher stability may be needed such as at locations with recurring inclement weather conditions, the deposit tank, storage tank, and photovoltaic panels can be separated and placed at a safe location, such as the harbor.

Figure 9A:
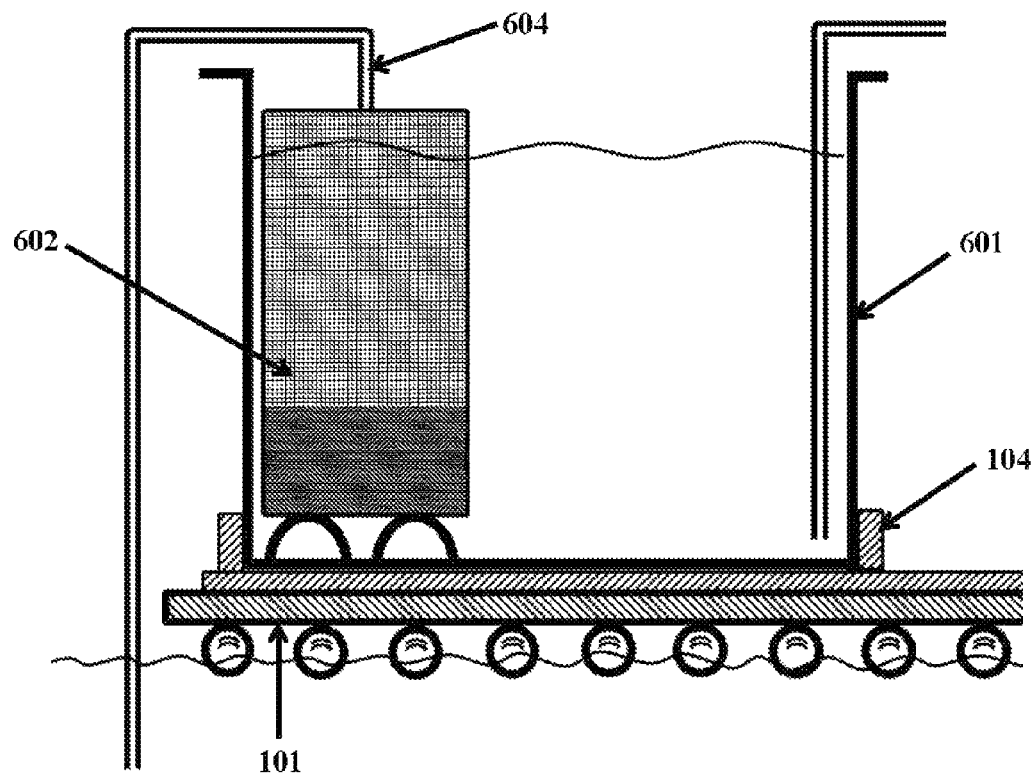
FIGS. 9A and 9B are a side view of the seawater tank and a perspective view of the filter system.
Figure 9B:
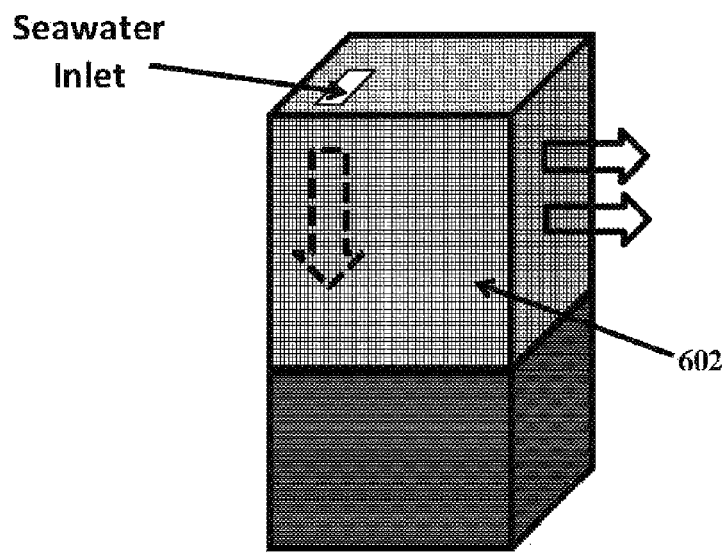

The seawater tank 601 can extract seawater at standard salinity with a seawater extraction tube 604 and is inserted into a filter system 602 inside the seawater tank 601, as shown in FIG. 9A. The filter system 602, as shown in FIG. 9B, removes solid substances such as sand, from the extracted seawater. Afterwards, the filtered seawater is pumped into the evaporator tank 701, as shown in FIG. 11A.

Figure 10:
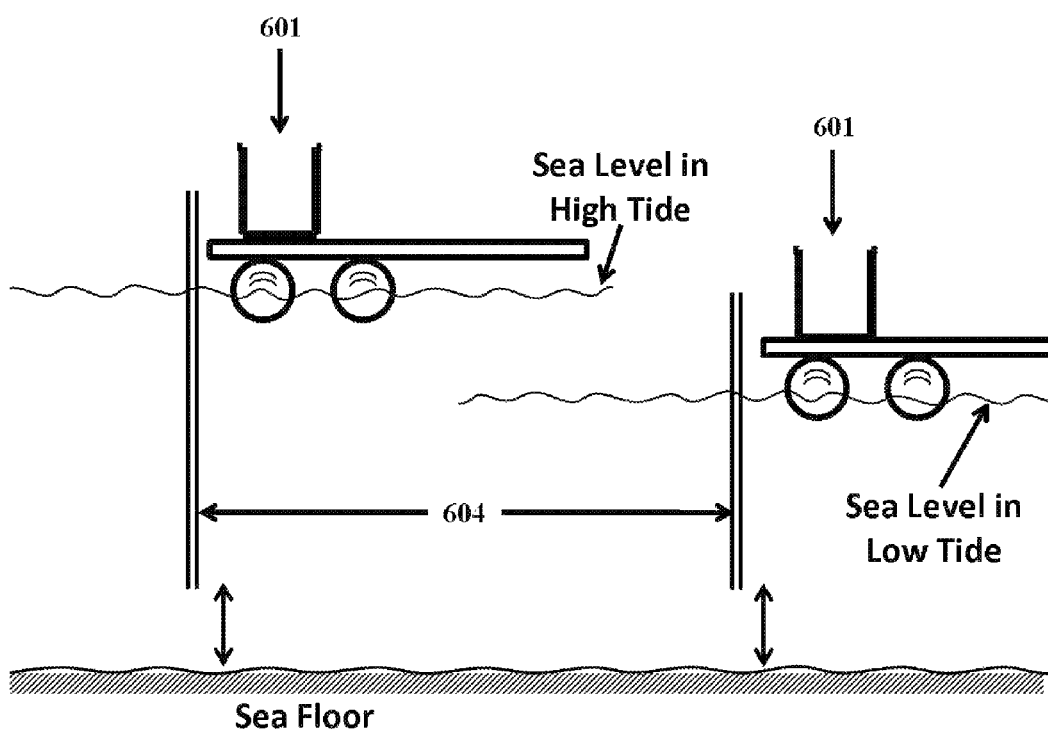
FIG. 10 is a side view of the seawater extraction tube, which can be adjustable.

To be able to extract seawater at a desired distance from the sea floor, the seawater extraction tube 604 can be adjustable in height, regardless whether the offshore location is in high tide or low tide, as shown in FIG. 10.

Figure 11A:
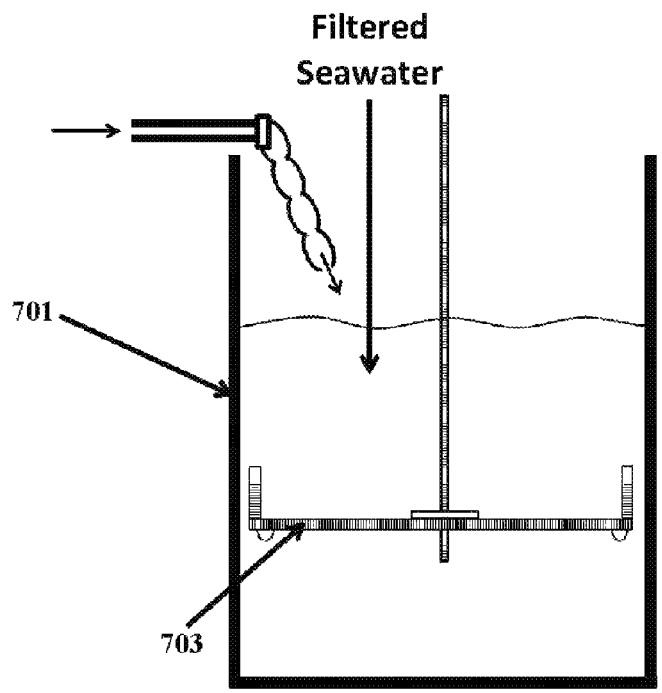
FIGS. 11A and 11B are side views of the evaporator tank and its water level.
Figure 11B:
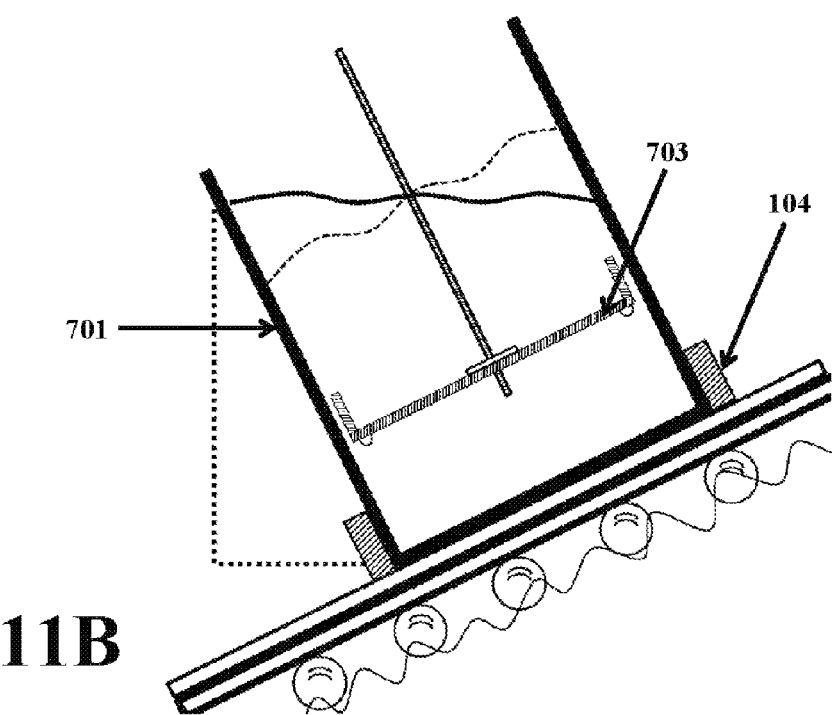

The filtered seawater from the seawater tank 601, as shown in FIG. 9A, is pumped into the evaporator tank 701, as shown in FIG. 11A, in which the evaporation process is then performed. The amount of filtered seawater inside the evaporator tank 701 can be controlled. The water level inside the evaporator tank 701 must not be too high, as shown in FIG. 11B, when the evaporator tank 701 is shaken by hitting sea waves, in which the filtered seawater can spill out of the evaporator tank 701. The evaporator tank 701 can be reinforced by tank supports 104.

Figure 12A:
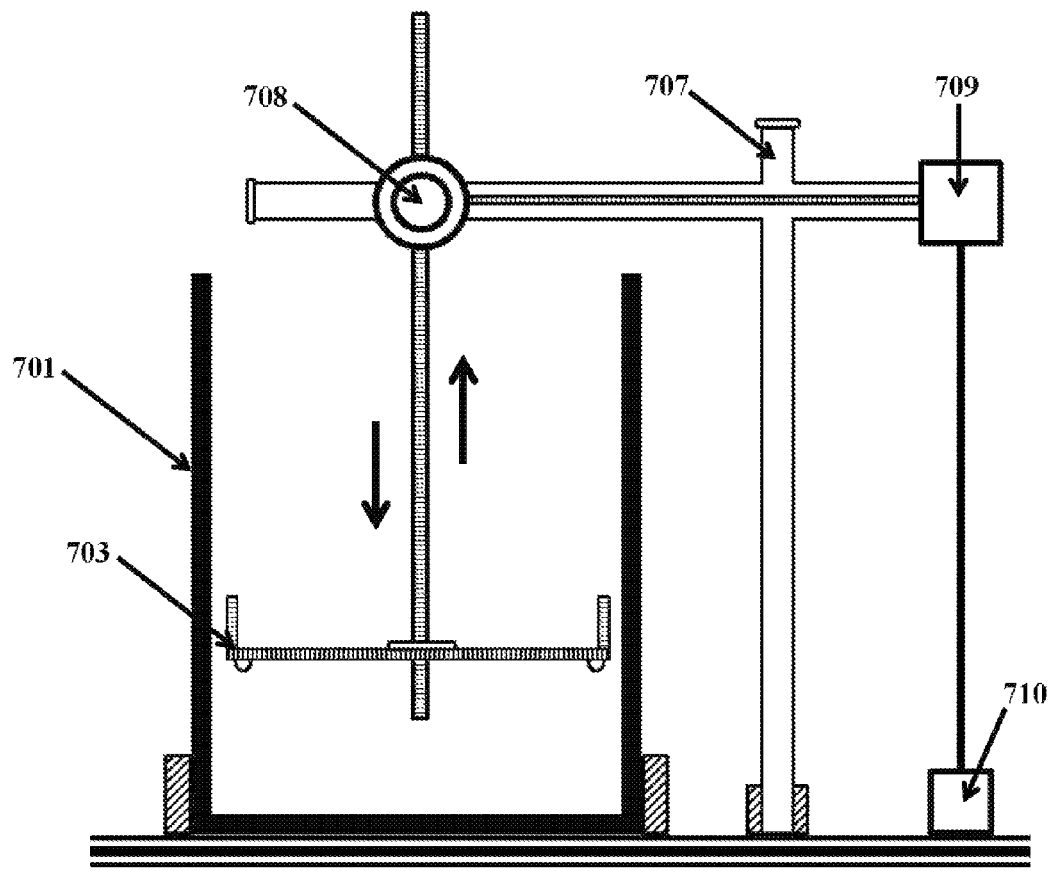
FIGS. 12A, 12D, and 12B are side views and a top view of the evaporator tank and its components
Figure 12B:
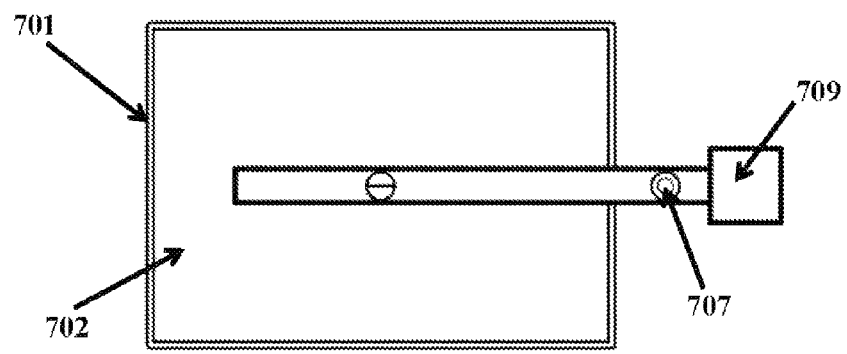
Figure 12C:
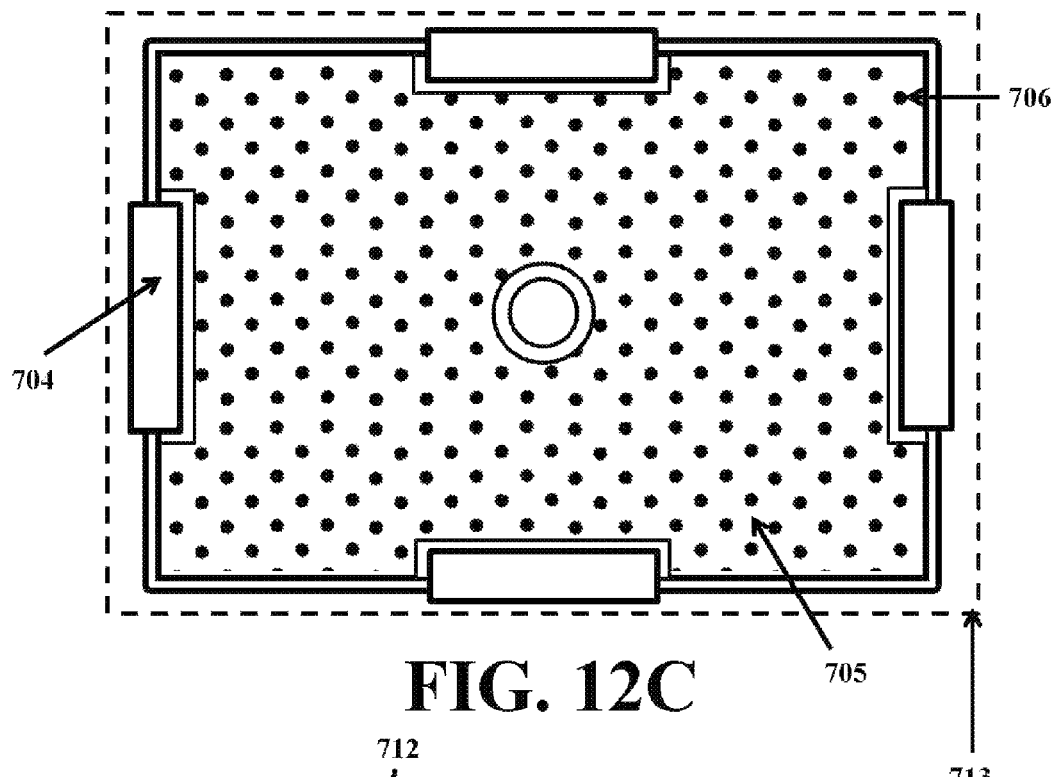
FIG. 12C is a top view of the evaporator plate, a component of the evaporator tank.
Figure 12D:
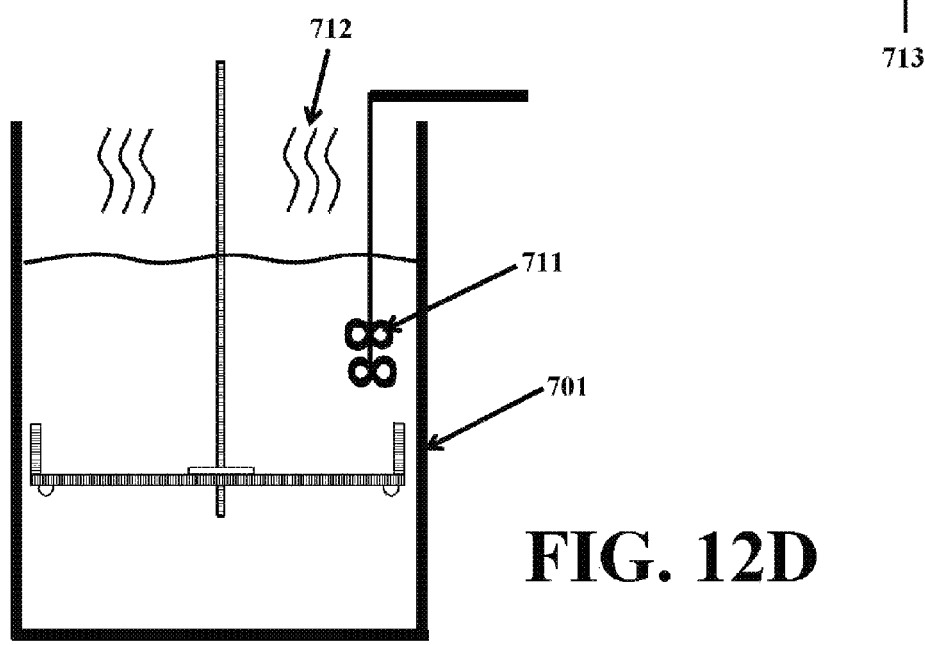
Figure 17A:
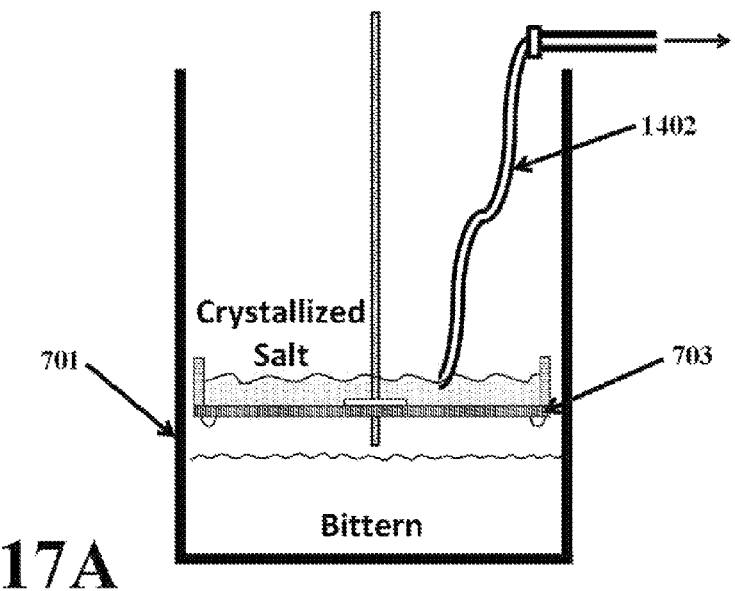
FIG. 17A is a side view of the produced crystallized salt and bittern in the evaporator tank after the evaporation process.

The evaporator plate 703, a component of the evaporator tank 701, is adjusted in height by using a gearbox 708, an evaporator plate support 707, a motor 709, and a controller 710, as shown in FIG. 12A. The evaporator plate surface 705 is parallel to the bottom of the evaporator tank 701 and has a smaller perimeter than the perimeter 713 of the evaporator tank 701. The evaporator tank 701 can have an open top 702, as shown in FIG. 12B, to allow the produced water vapor 712 to exit during the evaporation process. The evaporator plate surface 705 has small holes 706, which form a sieve surface, as shown in FIG. 12C. The sieve surface allows the produced bittern mixed with the produced crystallized salt to seep to the bottom of the evaporator tank 701, as shown in FIG. 12C, when the evaporator plate 703 is lifted above the water level in the evaporator tank 701 after the evaporation process, as shown in FIG. 17A. The evaporator plate 703 has circulation openings 704 to allow the seawater to circulate below and above the evaporator plate 703 during the evaporation process. After the evaporation process, the produced crystallized salt lies on the evaporator plate 703 and the produced bittern lies below the evaporator plate 703 at the bottom of the evaporator tank 701, as shown in FIG. 17A. The circulation in the evaporator tank 701 during the evaporation process can be aided by a mixer 711, a component of the evaporator tank 701, as shown in FIG. 12D.

Figure 13A:
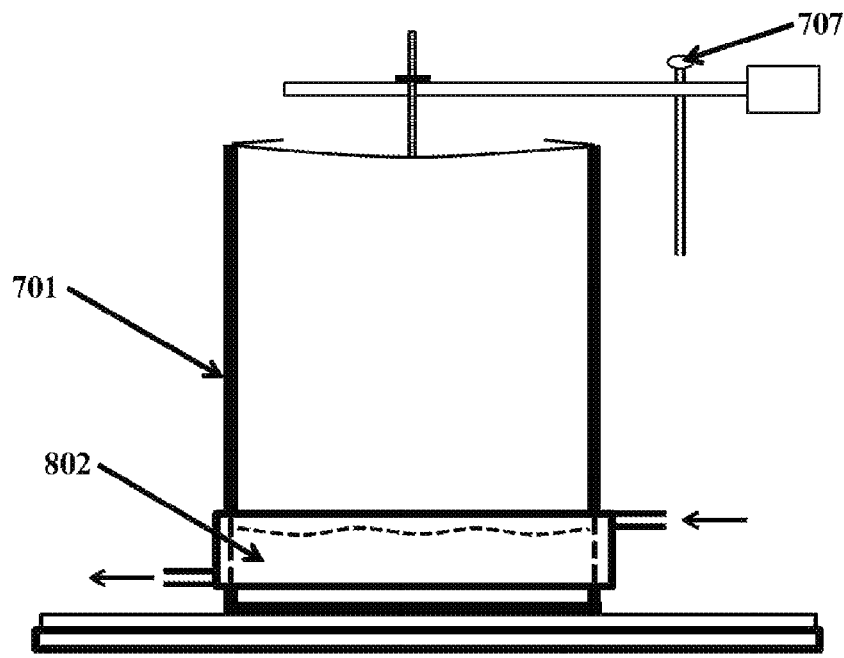
FIGS. 13A and 13B are side views of the heat exchangers attached to the outer surface of the evaporator tank.
Figure 13B:
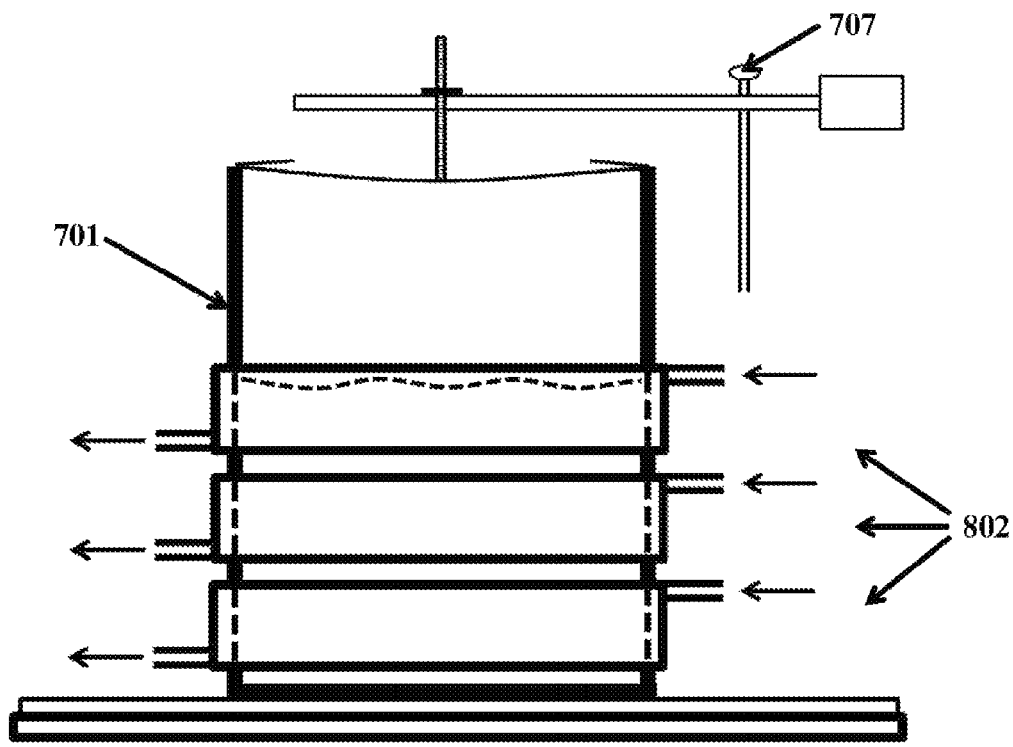
Figure 14:
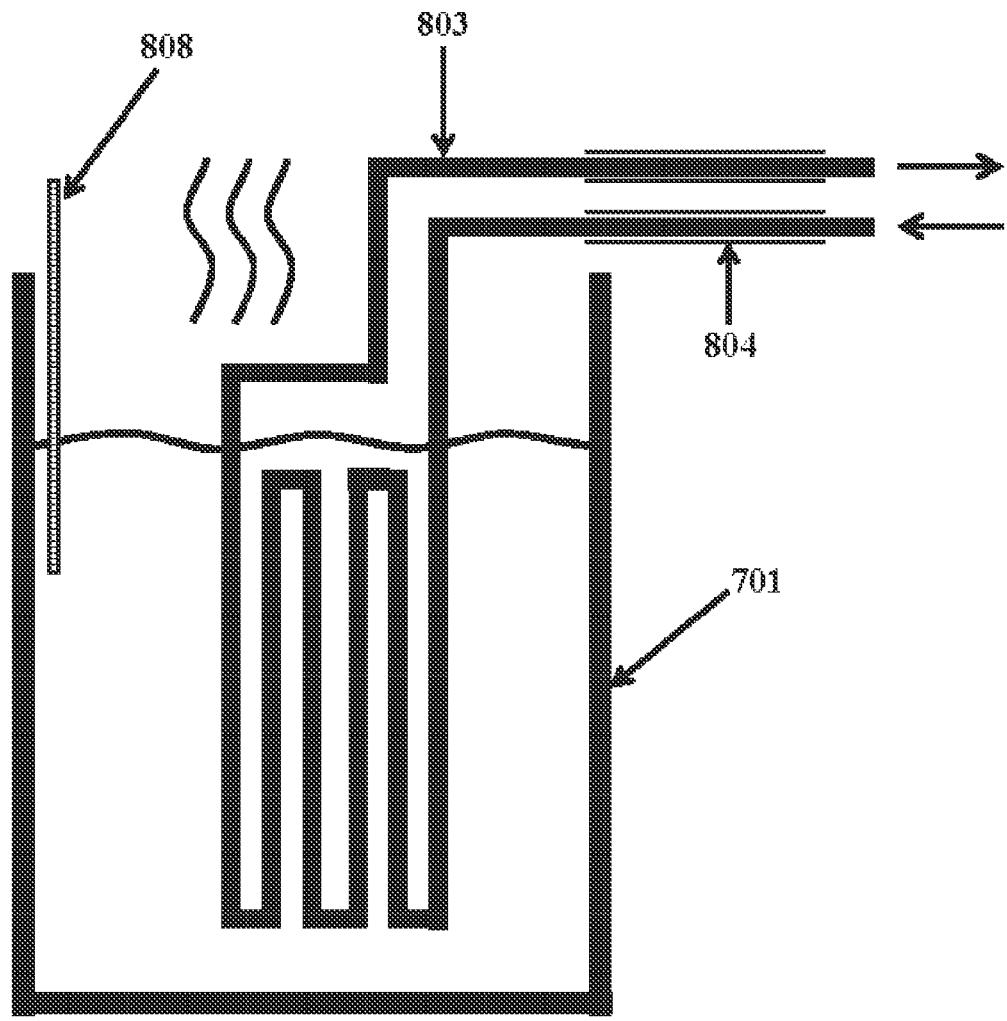
FIG. 14 is a side view of a heating pipe as a heat exchanger of the evaporator tank.

The heating used for the evaporation process in the evaporator tank 701 can be supplied through a heat exchanger 802 or multiple heat exchangers 802 attached to the outer surface of the evaporator tank 701, as shown in FIGS. 13A and 13B. Another heating method which can be used for the evaporation process is by installing a heating pipe 803 as a heat exchanger 802 coiled around the inner surface of the evaporator tank 701, as shown in FIG. 14. Pipe coverings 804 can be used around the heating pipe 803 to prevent heat loss from the heating tank 801.

Figure 15A:
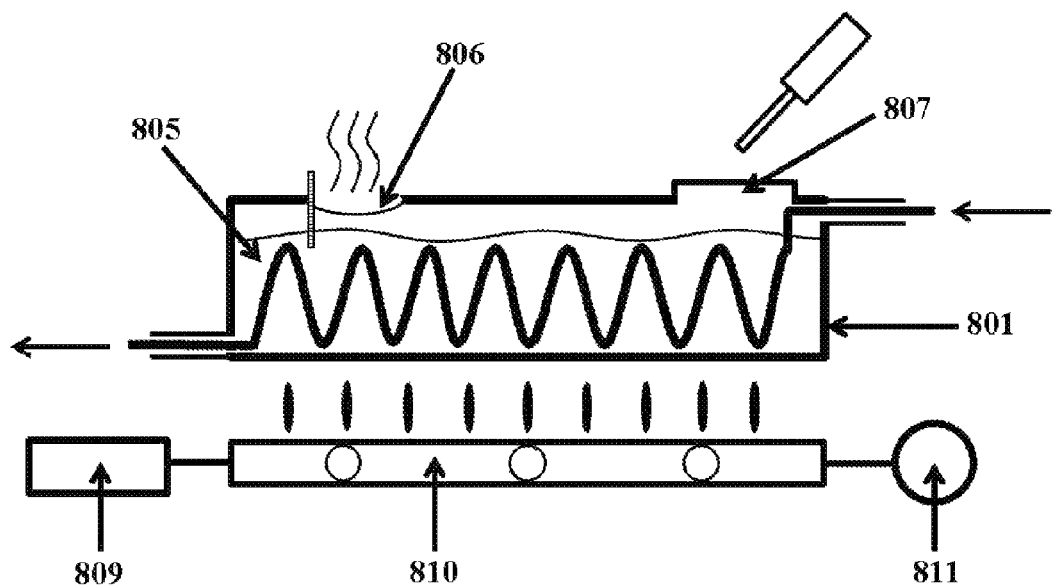
FIGS. 15A and 15B are side views of the heating tank.
Figure 15B:
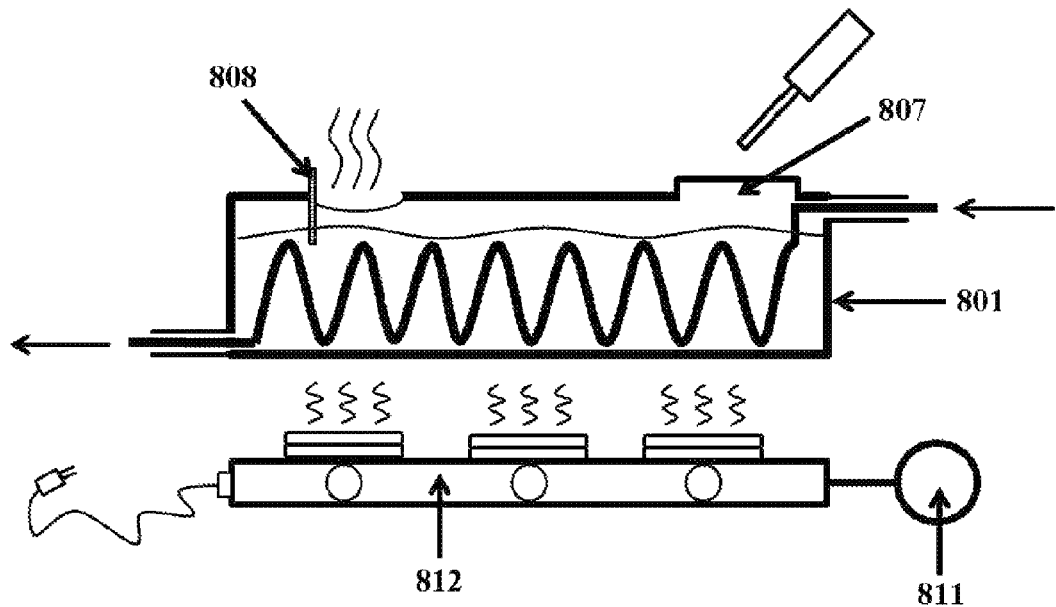

The liquid 805 used in the heat exchanger 802 is heated in the heating tank 801. The heating energy used for heating the heat exchanger 802 can be supplied with a gas burner 810, which its gas can be supplied from the gas tank 809, or can be supplied with an electric heater 812, as shown in FIGS. 15A and 15B. The heating tank 801 can be consisted of the heating tank liquid 805, the liquid inlet 807, the heating tank opening 806, and the temperature gauge 808. The heat controller 811 can be used to control the heating temperature of the heating tank liquid 805 in the heating tank 801.

Figure 16A:
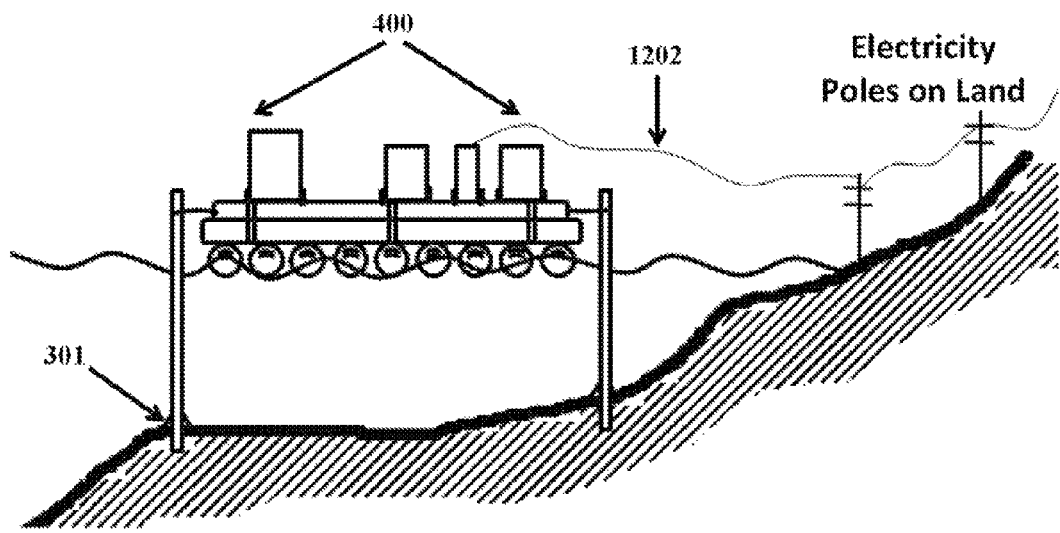
FIG. 16A is a side view of electric cables supplying electricity from poles on land to the floating salt farm.
Figure 16B:
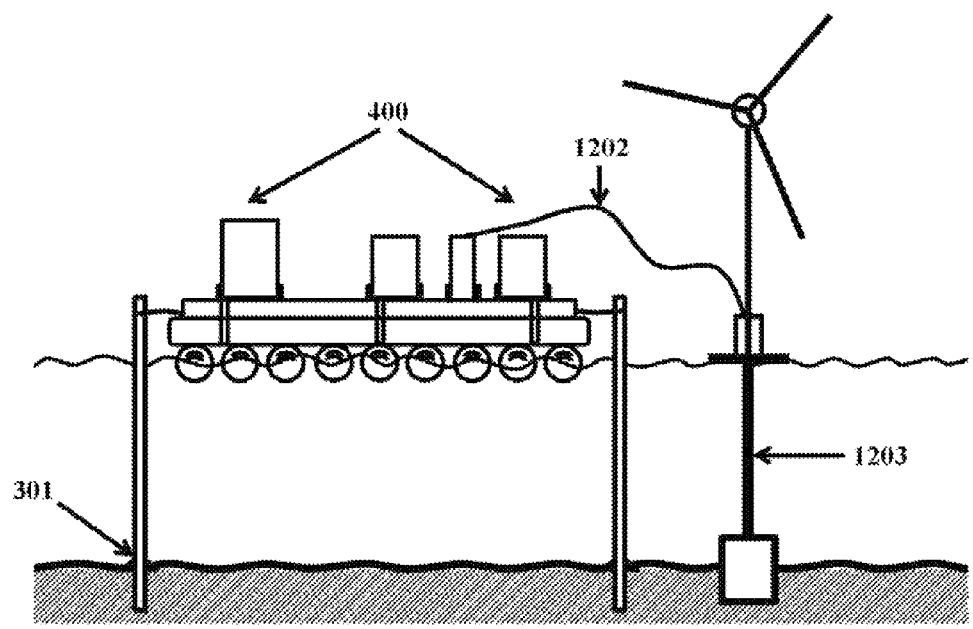
FIG. 16B is a side view of electric cables supplying electricity to the floating salt farm from offshore wind turbines.

Electricity can be supplied to the floating salt farm from electricity poles on land through electric cables 1202, as shown in FIG. 16A or from offshore wind turbines 1203, through electric cables 1202, as shown in FIG. 16B.

Figure 17B:
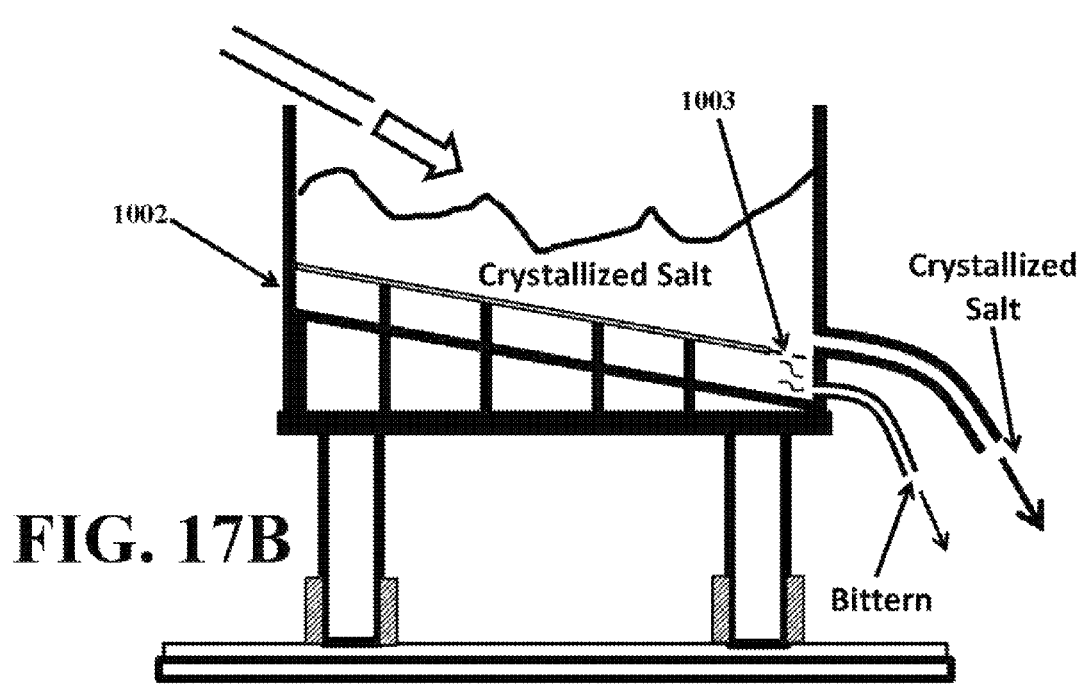
FIG. 17B is a side view of the deposit tank component.
Figure 17C:
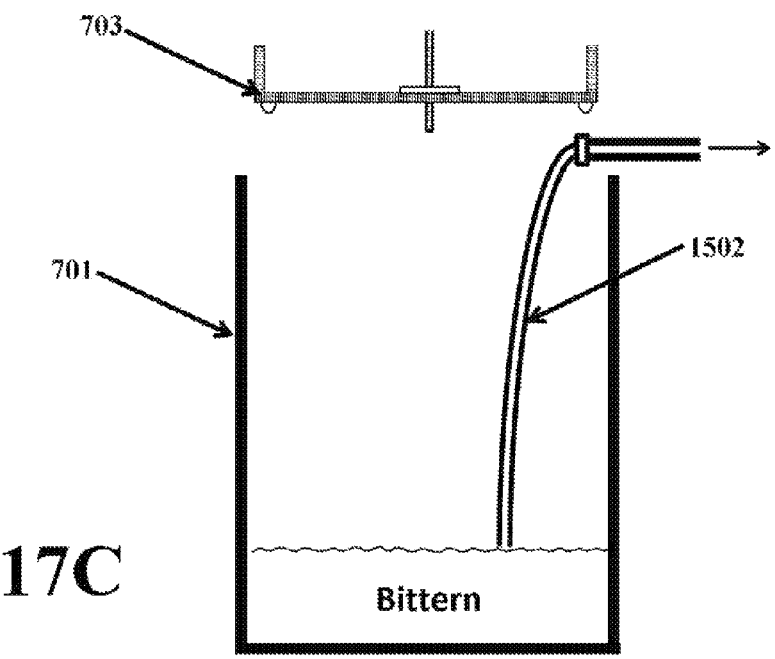
FIG. 17C is a side view of the produced bittern in the evaporator tank.
Figure 17D:
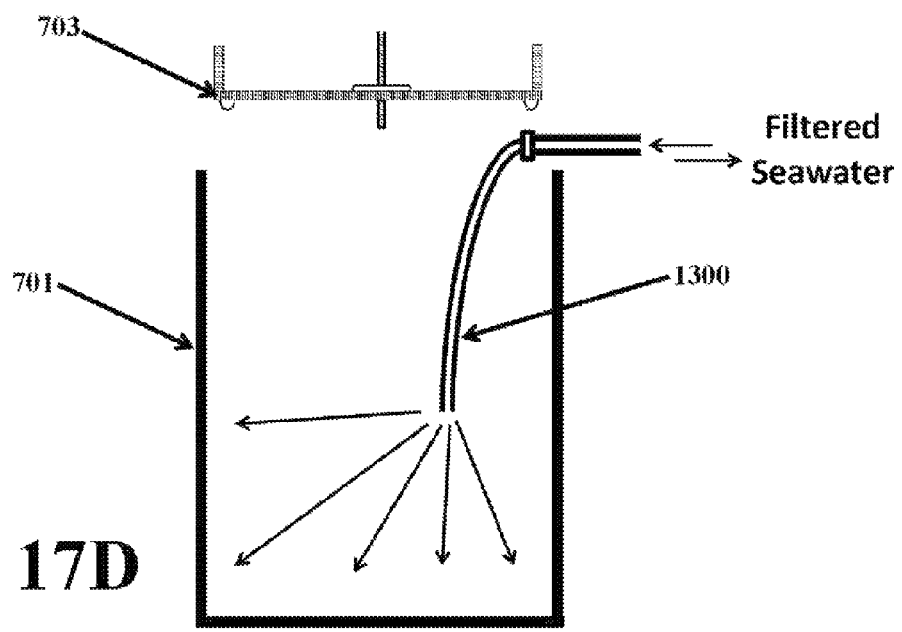
FIG. 17D is a side view of the evaporator tank during the cleaning process.
Figure 20:
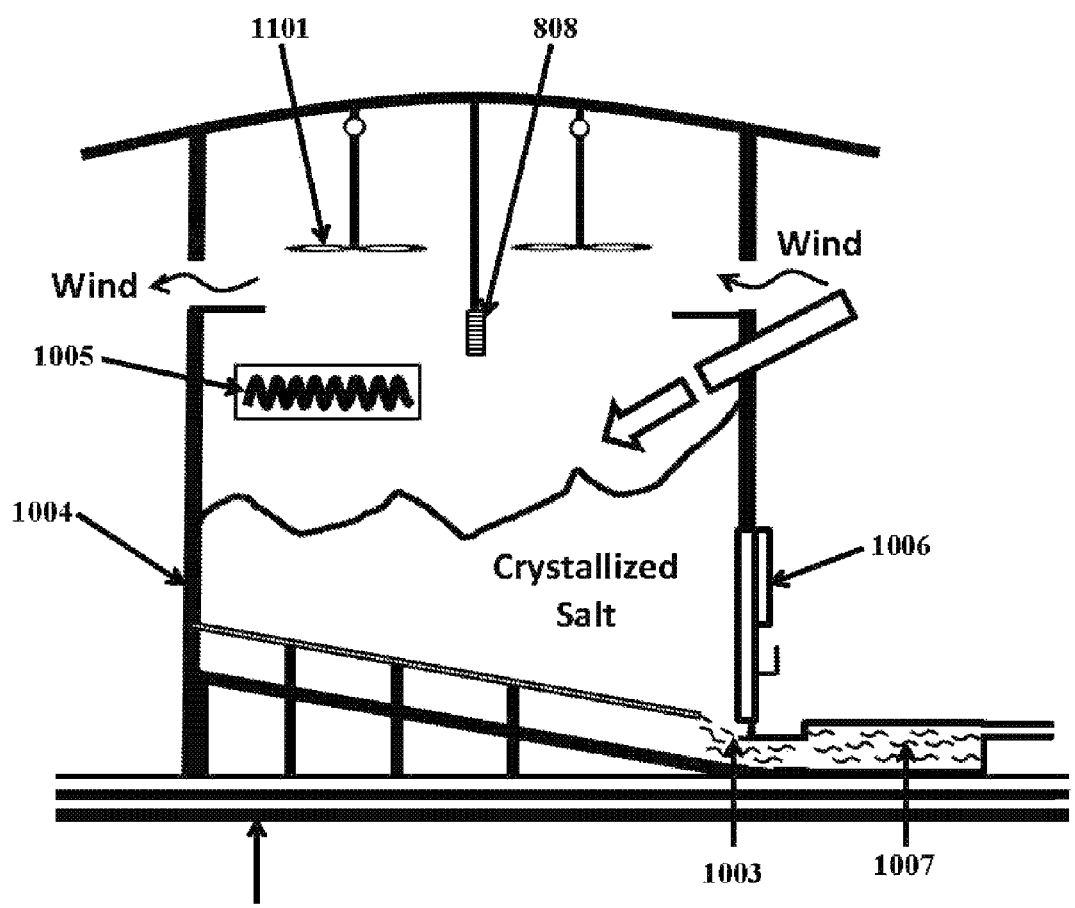
FIG. 20 is a side view of the storage tank component.

After the evaporation process has finished in the evaporator tank 701, the produced crystallized salt and the bittern remain. The produced crystallized salt is settled on the evaporator plate 703 and the produced bittern is below the evaporator plate at 703 the bottom of the evaporator tank 701. The evaporator plate 703 is lifted above the water level, as shown in FIG. 17A, and the produced crystallized salt can then be pumped into the deposit tank 1002 by using a crystallized salt extraction tube 1402, as shown in FIGS. 17A and 17B. The flooring of the deposit tank 1002 can be at an angled slope to help detach the bittern that is attached to the crystallized salt. There can be a mesh opening 1003 at the bottom of the slope to allow the bittern, which can be detached from the crystallized salt, to seep through. Afterwards, the produced crystallized salt and bittern can then be placed into the storage tank 1004 and bittern storage tank 1007 respectively, as shown in FIG. 20. After the crystallized salt extraction process in the evaporator tank 701, the evaporator plate 703 can be lifted above the top of the evaporated tank 701 with a controller 710, as shown in FIG. 17C. The remaining bittern at the bottom of the evaporator tank 701 can then be extracted by using a bittern extraction tube 1502, as shown in FIG. 17C, and then pumped into the bittern storage tank 1007, as shown in FIG. 20. After the evaporation process is repeated several cycles, the evaporator tank 701 can be cleaned using a pressured hose 1300 spraying filtered seawater, as shown in FIG. 17D, in which afterwards, the seawater used for cleaning is extracted using an extraction tube. The evaporation process is then resumed.

Figure 18A:
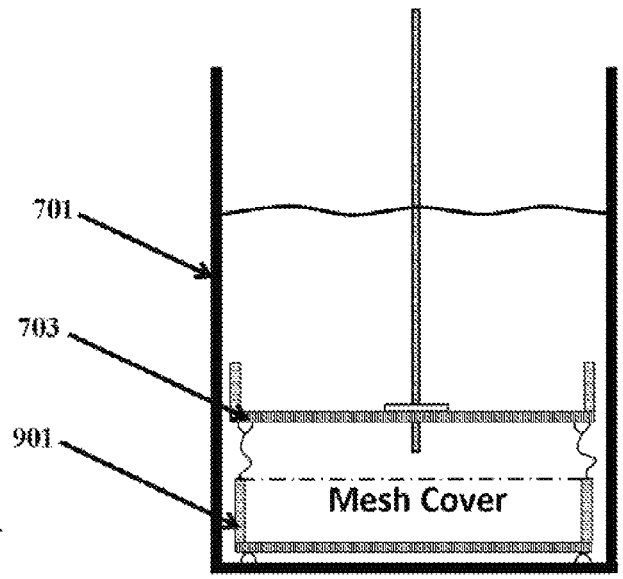
FIGS. 18A, 18B, and 18C are side views of the evaporator bin in the evaporator tank.
Figure 18B:
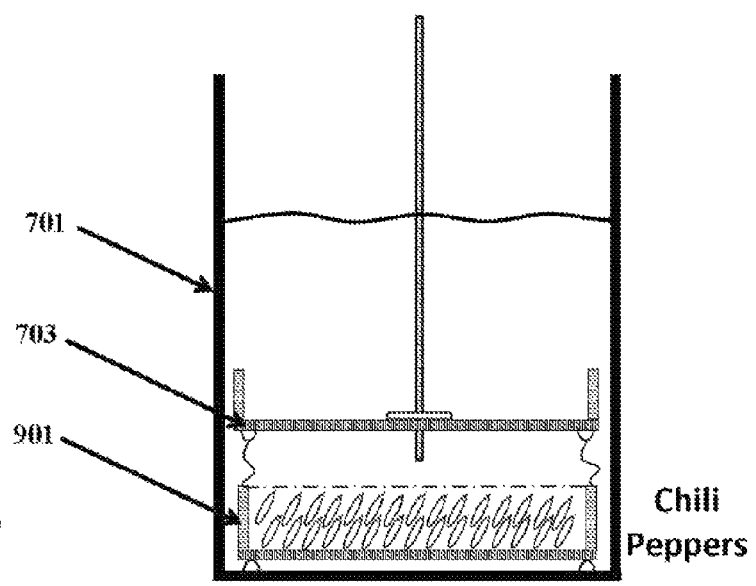
Figure 18C:
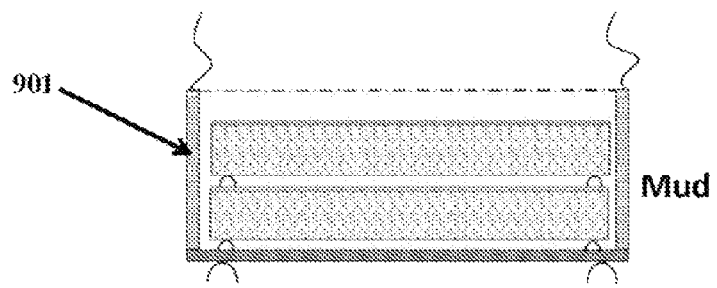

If certain contents are placed with the filtered seawater inside the evaporator tank 701 during the evaporation process, the produced crystallized salt and bittern can be adjusted to have desired properties such as color, taste, smell, and mineral composition. These contents are put inside the evaporator bin 901, as shown in FIG. 18A, a holding device, such as a container, which can be linked to the bottom of the evaporator plate 703. The sides of the evaporator bin 901 can have small holes in order to facilitate circulation of seawater through the contents in the evaporator bin 901 during the evaporation process. The top of the evaporator bin 901 can be encased with a mesh cover, which can be removed to put contents inside. The mesh cover ensures that the contents stay inside the evaporator bin during the evaporation process. The contents to be put inside the evaporator bin 901, can be chili peppers, as shown in FIG. 18B, or mud, as shown in FIG. 18C.

Figure 19:
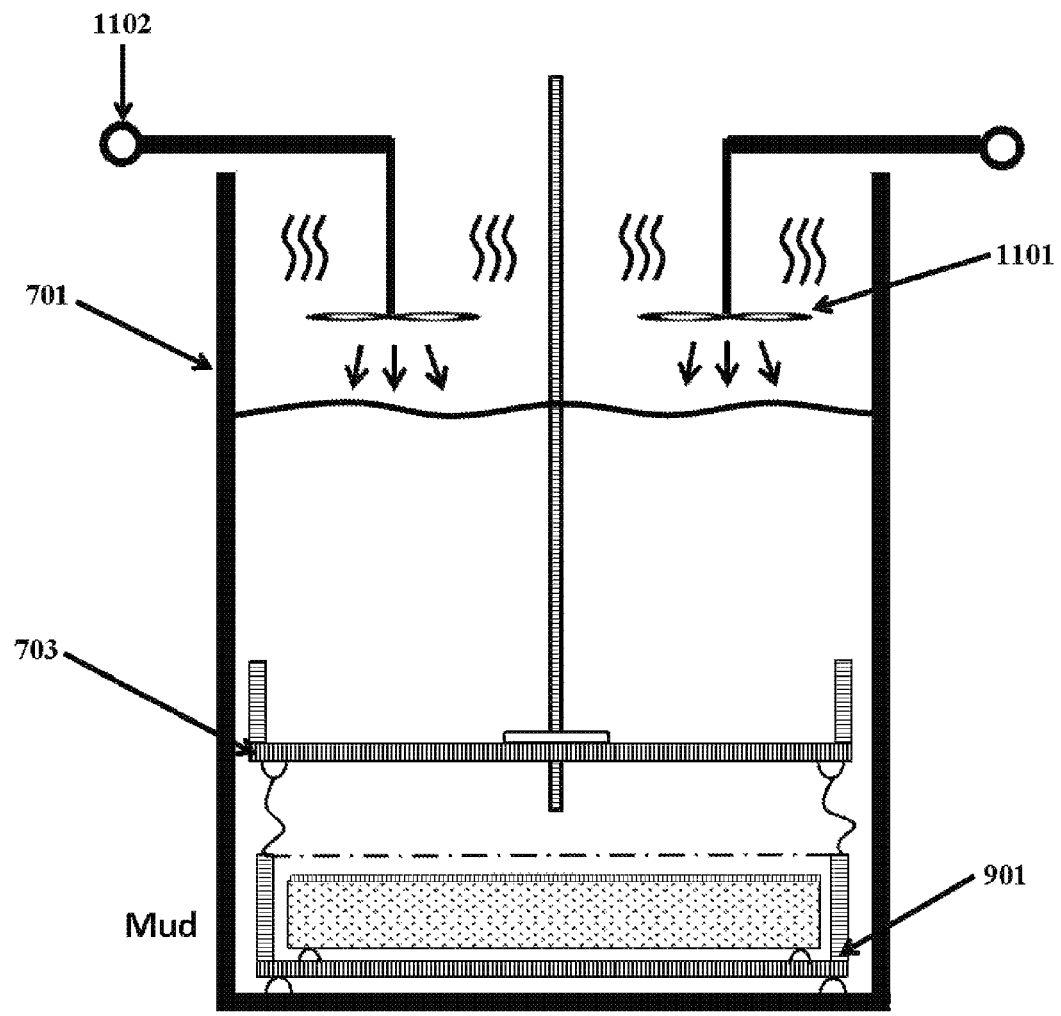
FIG. 19 is a side view of an embodiment of the evaporator tank during the evaporation process.

To produce crystallized salt and bittern of desired quality, such as the quality of natural sun-dried salt and bittern produced in traditional salt ponds, several adjustments can be made during the evaporation process in the floating salt farm. An embodiment of the evaporator tank is shown in FIG. 19. To do so, mud, which can be the mud used in traditional salt ponds, can be placed inside the evaporator bin 901 inside the evaporator tank 701 with the extracted seawater during the evaporation process and the heating temperature can be adjusted accordingly. Installed wind propeller components 1101 in the evaporator tank 701 can be used to emulate the sea breeze and can be controlled with a wind propeller controller 1102.

Figure 24:
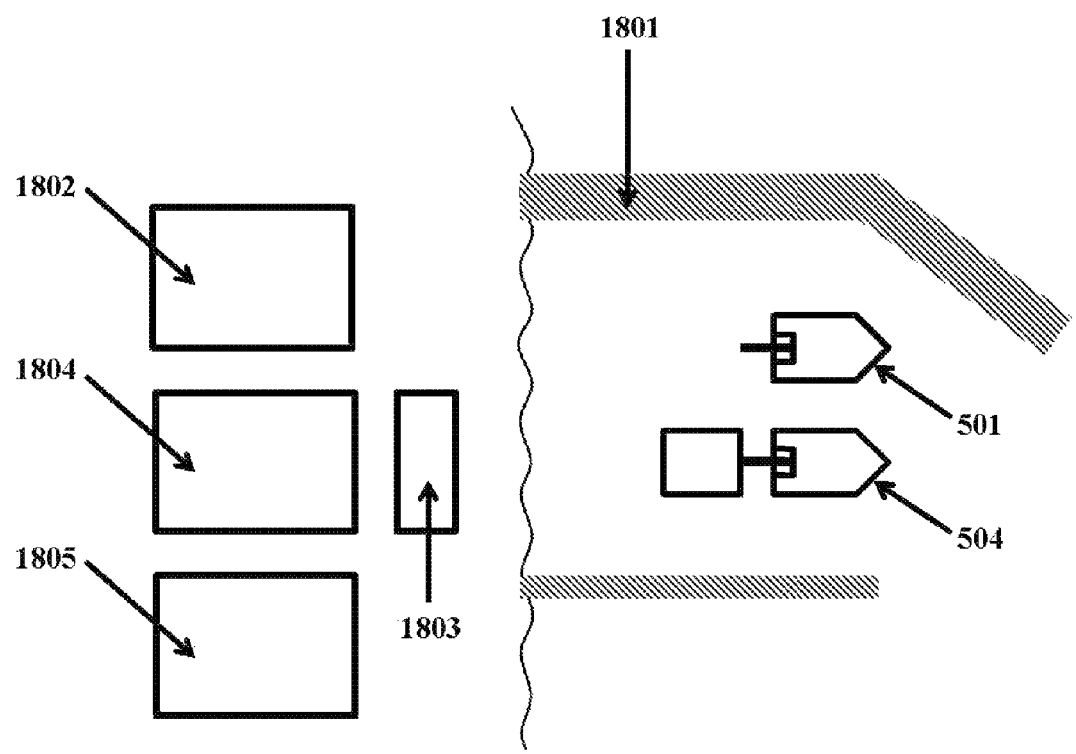
FIG. 24 is a top view of the facilities on the harbor.

The produced crystallized salt and bittern are placed into the storage tank 1004. Inside the storage tank 1004, as shown in FIG. 20, the flooring can be at an angled slope to help detach the bittern that is attached to the crystallized salt. The storage tank 1004 can also have a mesh opening 1003 to allow the bittern to seep through at the bottom of the slope, which leads to the bittern storage tank 1007. The storage tank 1004 can have openings to allow the sea breeze inside the storage tank 1004, such as windows, and can have installed wind propeller components 1101 to help dry the crystallized salt. Also, a heater 1005 can be installed inside the storage tank 1004 to help dry the crystallized salt by adjusting the temperature. The temperature gauge 808 is a device used to assess the temperature inside the storage tank 1004. Afterwards, the dried crystallized salt and the gathered bittern are kept inside the storage tank 1004 until they are ready to be transported to a warehouse 1802 on the harbor using a transport vessel 504, as shown in FIG. 24, through the storage gate 1006 of the storage tank 1004.

Figure 21A:
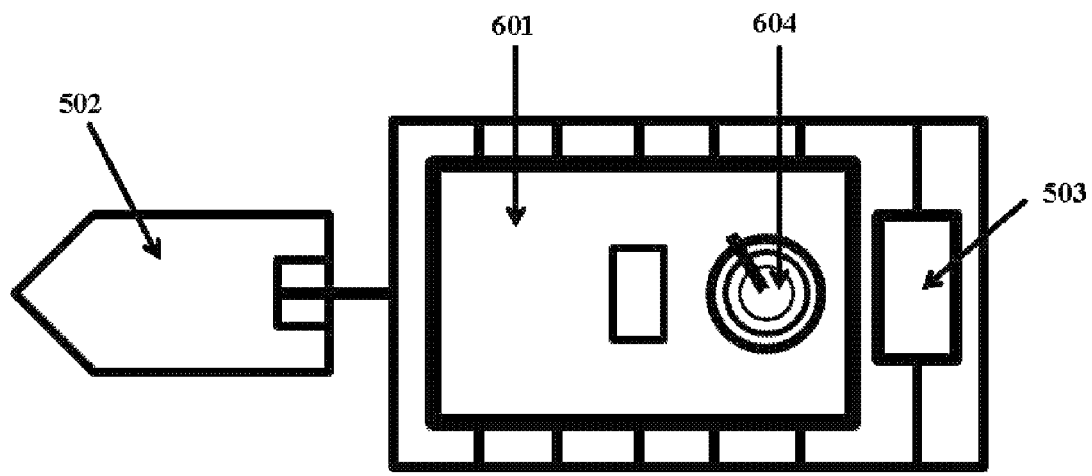
FIGS. 21A and 21B are a top view and a side view of the seawater extraction vessel.
Figure 21B:
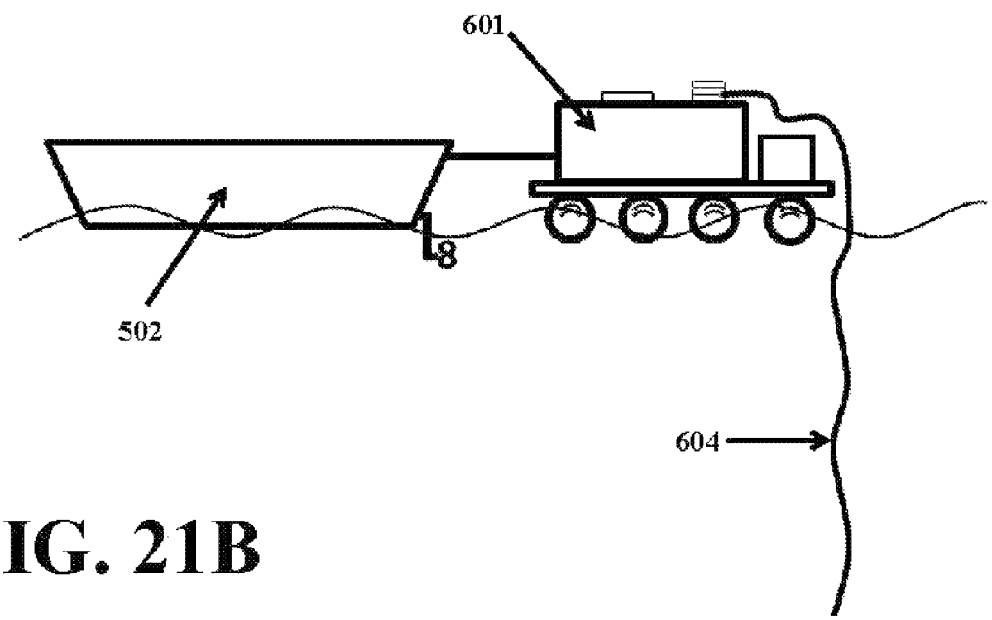

The seawater to be used for the floating salt farm can be extracted at desired water depths to extract seawater with desired mineral compositions using a seawater extraction vessel 502, as shown in FIGS. 21A and 21B. The seawater can be pumped into the seawater tank 601 using the seawater extraction tube 604 powered by the seawater extraction pump 503. The extracted seawater is then transported to the floating salt farm to be used for the evaporation process to produce crystallized salt and bittern.

Figure 22A:
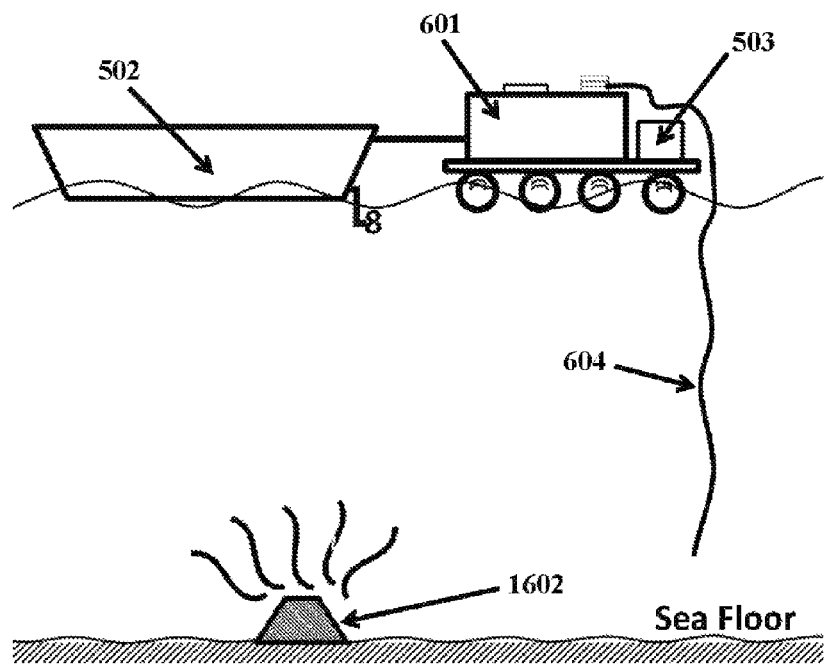
FIGS. 22A and 22B are side views of the seawater extraction vessel and the floating salt farm in the proximity of volcanic sites.
Figure 22B:
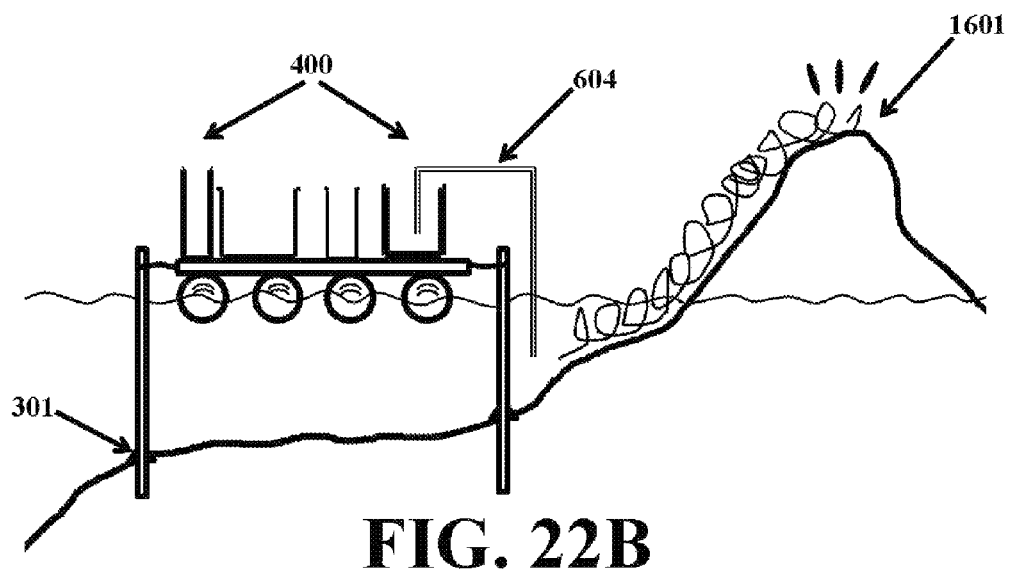

The seawater can be extracted in the proximity of volcanic sites, in which the seawater in those areas can have affected mineral compositions, due to volcanic activity, as shown in FIGS. 22A and 22B. The volcano, in which has affected the mineral composition of seawater to be extracted for the evaporation process, can be an underwater volcano 1602 or a volcano on land 1601.

Figure 23A:
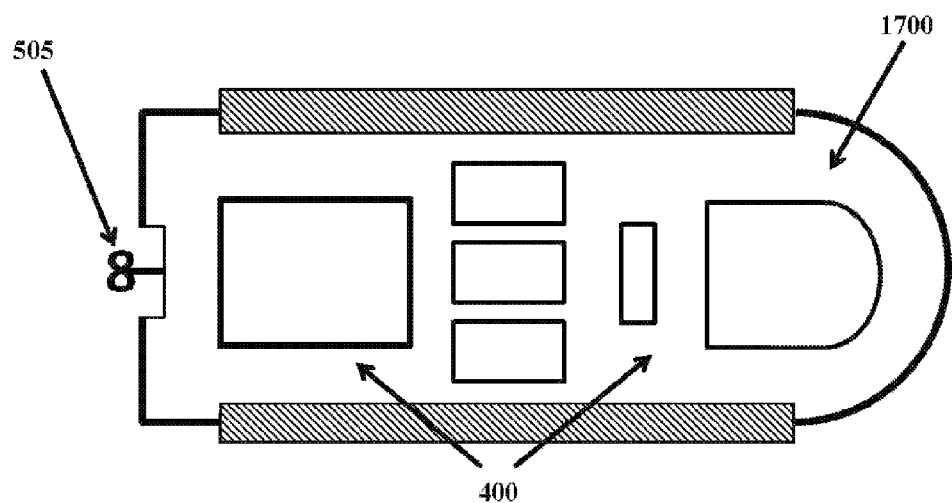
FIGS. 23A and 23B are a top view and a side view of a barge as a buoyant foundation.
Figure 23B:
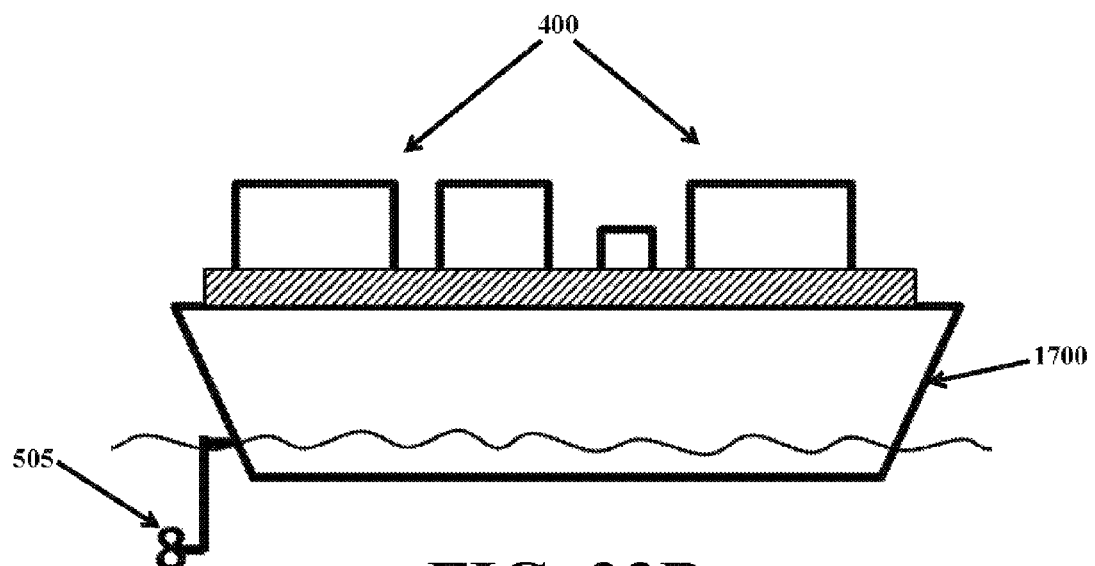

A barge 1700 can be used as a buoyant foundation 101 for the floating salt farm, which then the floating salt farm components 400 are fixed on the top of the flooring deck 103 of the barge 1700, as shown in FIGS. 23A and 23B. A motor propeller component 505 can be installed on the barge 1700 to move to a certain offshore location or to escape from inclement weather conditions to a safe location.

The produced crystallized salt and the bittern from the floating salt farm can be transported to a warehouse 1802 on the harbor, as shown in FIG. 24, by a transport vessel 504. The crystallized salt and bittern can be further processed at other facilities on the harbor, such as the refinery and treatment plant 1804, and the packing facility 1805. All the necessary materials and energy supply for the floating salt farm can be delivered from the energy supply station 1803 on the harbor by transport vessel 504. A towboat 501 can also be stationed at the harbor. The harbor also has a harbor sea wall 1801 used to protect vessels from hitting sea waves. The harbor would be a safe location for the floating salt farm to be stationed during inclement weather conditions.

What is claimed is:

1. A system situated at an offshore location for producing crystallized salt and bittern, the system comprising:
   a buoyant foundation being situated on the surface of a body of seawater, the buoyant foundation comprising:
      at least one offshore structure or support structure installed onshore, connected to the buoyant foundation, for reinforcement; and
      a motor propeller installed or a towboat connected to the buoyant foundation, for movement; and
   components being fixed on the buoyant foundation, the components consisting essentially of:
      a seawater tank for extracting the seawater at the offshore location;
      an evaporator tank for evaporating the seawater which is pumped from the seawater tank to produce the crystallized salt and the bittern, the evaporator tank comprising:
         an evaporator plate for capturing the crystallized salt which is produced and the surface of the evaporator plate being a sieve surface;
         an evaporator tank opening for releasing water vapor which is produced, to the atmosphere; and
         at least one wind propeller for supplying breeze; and
      a heating tank for supplying heating energy to the evaporator tank;
      a deposit tank for detaching the bittern attached to the crystallized salt which is pumped from the evaporator tank, the deposit tank comprising a flooring with an angled slope;
      a storage tank for drying and storing the crystallized salt which is pumped from the deposit tank and storing the bittern which is pumped from the evaporator tank and the deposit tank, the storage tank comprising a flooring with an angled slope, a heater and at least one wind propeller; and
      a plurality of photovoltaic panels for supplying electricity to the heating tank.

2. The system according to claim 1, wherein said evaporator tank further comprises at least one evaporator bin, said at least one evaporator bin being a holding device for placing contents and being inside said evaporator tank, such that the contents affects properties of said crystallized salt and said bittern.

3. The system according to claim 2, wherein said contents are mud which can be used in salt ponds, such that said crystallized salt and said bittern have properties of natural sun-dried salt and bittern which are produced in salt ponds.

4. The system according to claim 1, further comprising a seawater extraction vessel connected to the seawater tank for extracting seawater at the offshore location, the seawater extraction vessel being situated at (a) the offshore location where the seawater is extracted at a selected water depth or (b) the offshore location being around a volcanic site where the seawater is affected by volcanic eruption activity; and
wherein the seawater has selected mineral compositions.

5. The system according to claim 1, wherein said buoyant foundation is a movable structure comprising a barge with a motor propeller.

* * * * *